(12) United States Patent
Thompson et al.

(10) Patent No.: US 9,895,848 B2
(45) Date of Patent: Feb. 20, 2018

(54) SYSTEMS AND TOOLING FOR MANUFACTURING COMPOSITE PARTS AND RELATED METHODS

(71) Applicant: The Boeing Company, Huntington Beach, CA (US)

(72) Inventors: Michael P. Thompson, Tacoma, WA (US); Otis Franklin Layton, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 14/693,363

(22) Filed: Apr. 22, 2015

(65) Prior Publication Data

US 2016/0311176 A1 Oct. 27, 2016

(51) Int. Cl.
| | |
|---|---|
| *B29C 70/30* | (2006.01) |
| *B29C 70/34* | (2006.01) |
| *B29C 70/44* | (2006.01) |
| B29L 31/30 | (2006.01) |

(52) U.S. Cl.
CPC .......... *B29C 70/30* (2013.01); *B29C 70/342* (2013.01); *B29C 70/446* (2013.01); *B29L 2031/3076* (2013.01)

(58) Field of Classification Search
None
See application file for complete search history.

(56) References Cited

U.S. PATENT DOCUMENTS

| 4,406,422 A * | 9/1983 | Philips .................. B65H 75/22 242/118.4 |
|---|---|---|
| 7,534,387 B2 | 5/2009 | Zenkner et al. |
| 2012/0119412 A1* | 5/2012 | Havens .................. B29C 33/00 264/230 |
| 2014/0261994 A1* | 9/2014 | Coffland ................ B29C 39/10 156/245 |

FOREIGN PATENT DOCUMENTS

| JP | 06047824 A * | 2/1994 | ............ B29C 43/36 |

OTHER PUBLICATIONS

Machine translation of JP06-47824, Jun. 16, 2017.*

* cited by examiner

*Primary Examiner* — Barbara J Musser
(74) *Attorney, Agent, or Firm* — DASCENZO Intellectual Property Law, P.C.

(57) ABSTRACT

Disclosed systems and tooling for manufacturing flanged ducts may improve upon prior art manufacturing techniques, such as by increasing ease of manufacturing and/or quality of resulting parts formed by the systems and tooling. One example of tooling includes a first tool piece that may be coupled to a base, and a second tool piece that is selectively coupled to and removable from the first tool piece. When positioned together in a closed position, the first tool piece and second tool piece form a composite material-receiving surface and a flange surface on which composite material may be placed and cured in order to form a composite part, such as a flanged duct. Such tooling may allow for placement of composite material over a male radius of the tooling, thereby improving ergonomics of the manufacturing process, as compared to attempting to place composite material into a female radius of prior art tooling.

10 Claims, 10 Drawing Sheets

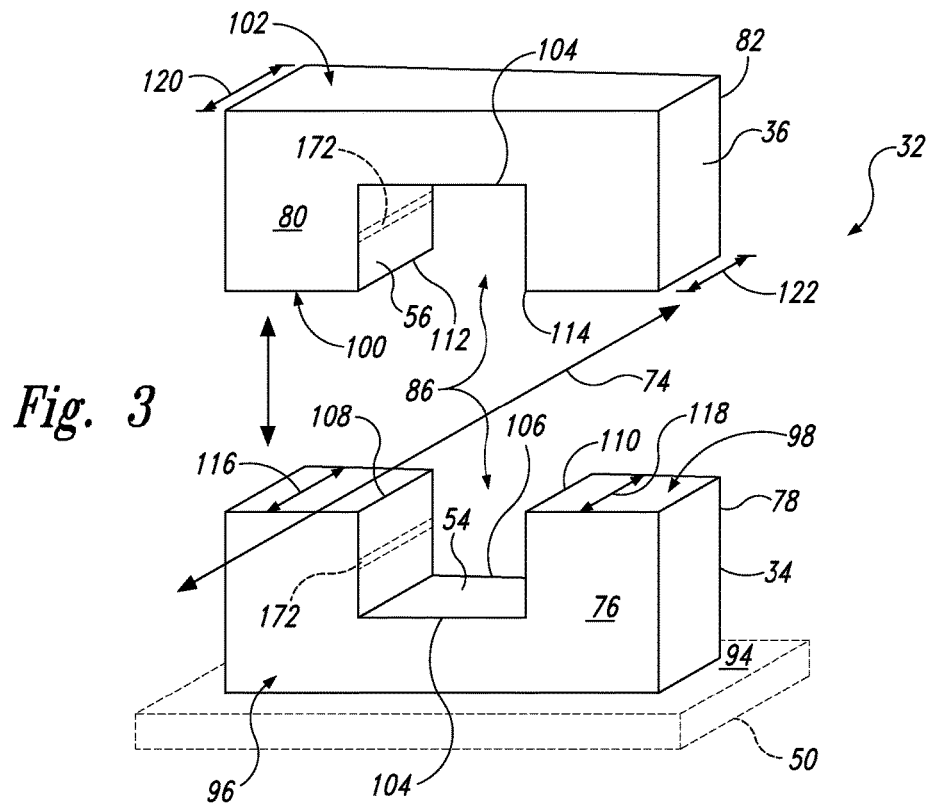
Fig. 3
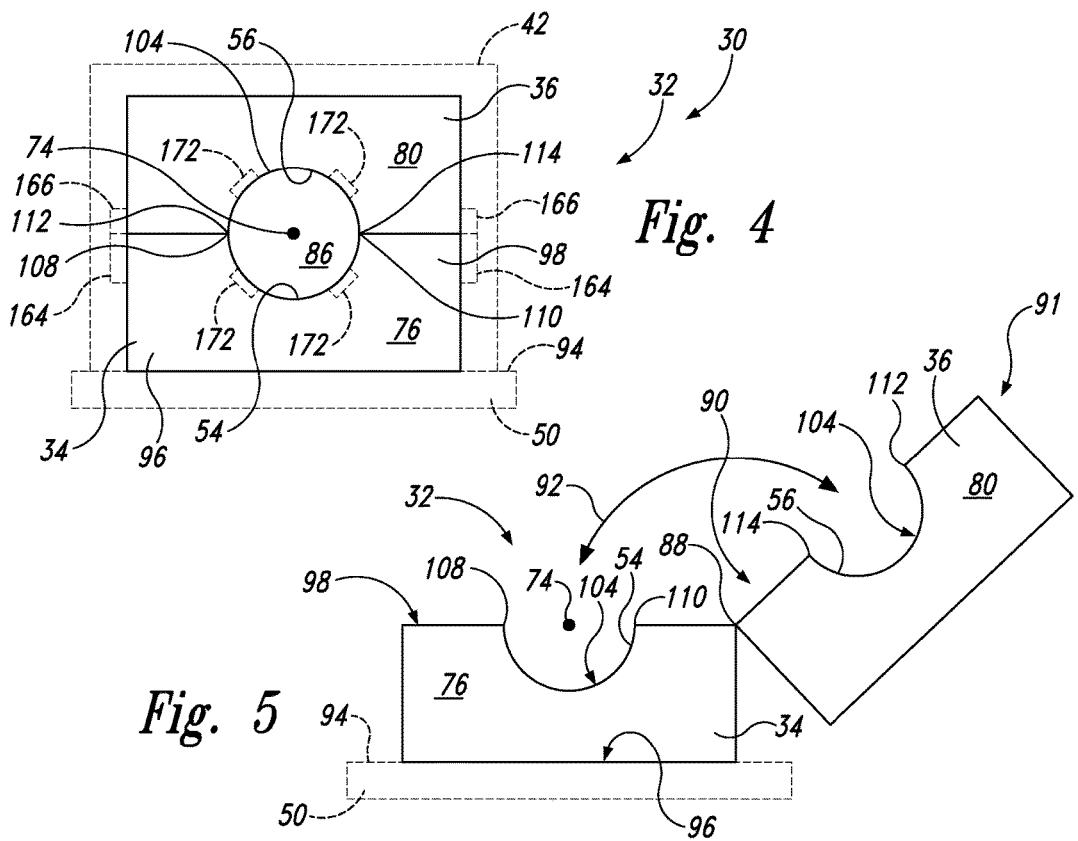
Fig. 4
Fig. 5

SYSTEMS AND TOOLING FOR MANUFACTURING COMPOSITE PARTS AND RELATED METHODS

FIELD

The present disclosure relates to systems and tooling for manufacturing composite parts, such as flanged ducts, and related methods.

BACKGROUND

Composite parts for various industrial applications are often manufactured by "laying up" composite material onto a piece of tooling (also referred to herein as a "tool") that serves as a mold. The material is cured (e.g., hardened) in place on the tooling, and the resulting shaped part is removed from the tooling after the material is cured. Different shaped parts present different manufacturing challenges. Existing methods and tooling for manufacturing parts, such as ducts with one or more integral flanges can be technically and/or ergonomically challenging to perform. For example, existing tooling for forming such flanged ducts consists of a cylindrical form with two planar plates attached thereto (one at either end of the cylindrical form) and arranged at an angle to one another. The intersections of the plates and the cylindrical form create a "female" fillet radius at each end of the cylindrical form, and composite material is laid up around the outside of the cylindrical form and against the female fillet radius and onto the plates, in order to form the flanges. Such tooling requires cutting and shaping many pieces of composite material of various shapes, fitting the pieces together on the tooling, and forming the material inside a female fillet radius where there is very little working space (e.g., the part is formed on an outer surface of the cylindrical form of the tooling and material must be laid inside the fillet radius formed between the cylindrical form and the plates). This can lead to difficult, expensive, and time-consuming techniques with unpredictable results and/or flawed parts having bridging, wrinkling, and/or high rejection rates.

SUMMARY

Presently disclosed systems, tooling, and related methods for manufacturing composite parts may reduce process times, improve ergonomics, and/or improve the quality of resulting parts. One example of a system configured for manufacturing a composite part (e.g., a flanged duct) from a composite material may include a tool and a vacuum device configured to draw a vacuum on the tool and composite material. The composite material may be configured to be placed on and substantially be conformed to a first composite material-receiving surface and a second composite material-receiving surface of the tool in order to form a tubular portion of the composite part, and the composite material may be configured to be conformed to a first flange surface of the tool in order to form a first flange of the flanged duct. The vacuum device may be configured to cause the composite material to be pressed against the first composite material-receiving surface, the second composite material-receiving surface, and the first flange surface of the tool, and the system may be configured to cure the composite material, thereby forming the composite part, the composite part being selectively removable from the tool after it is cured.

Presently disclosed tools for manufacturing composite parts may be two-piece tools, including a first tool piece and a second tool piece that is selectively moveable with respect to the first tool piece, such that the tool may be selectively moved from an open position to a closed position. The first tool piece may include a first flange surface, a second flange surface opposite the first flange surface, and a first composite material-receiving surface extending from the first flange surface to the second flange surface. The second tool piece may include a third flange surface, a fourth flange surface opposite the third flange surface, and a second composite material-receiving surface extending from the third flange surface to the fourth flange surface. In the closed position, the second tool piece may be positioned adjacent the first tool piece, the third flange surface and the first flange surface may be parallel to one another, the second flange surface and the fourth flange surface may be parallel to one another, and the first composite material-receiving surface may be arranged facing the second composite material-receiving surface such that the first composite material-receiving surface and the second composite material-receiving surface define a tool space in which the composite part may be formed. In the open position, at least a portion of the second tool piece may be spaced apart from the first tool piece, which may facilitate removal of the cured composite part.

Related methods of forming a composite part may utilize presently disclosed systems and tools. For example, related methods may include providing a tool according to the present disclosure, applying a composite material to the tool such that the composite material conforms to the first composite material-receiving surface and the second composite material-receiving surface of the tool, wherein the applying the composite material to the tool comprises applying the composite material to the tool such that a material outer surface of the composite material is in direct contact with the first composite material-receiving surface and the second composite material-receiving surface of the tool, the material outer surface being configured to form the part outer surface of the composite part, and curing the composite material, thereby forming the composite part.

BRIEF DESCRIPTION OF THE DRAWINGS

FIG. 3 is a schematic representation of illustrative, non-exclusive examples of tools for manufacturing a composite part, according to the present disclosure, shown in an open position.

FIG. 4 is a schematic representation of illustrative, non-exclusive examples of tools for manufacturing a composite part, according to the present disclosure, shown in a closed position.

FIG. 5 is a schematic representation of illustrative, non-exclusive examples of tools for manufacturing a composite part, according to the present disclosure, shown in an open position.

DESCRIPTION

Figure 1:
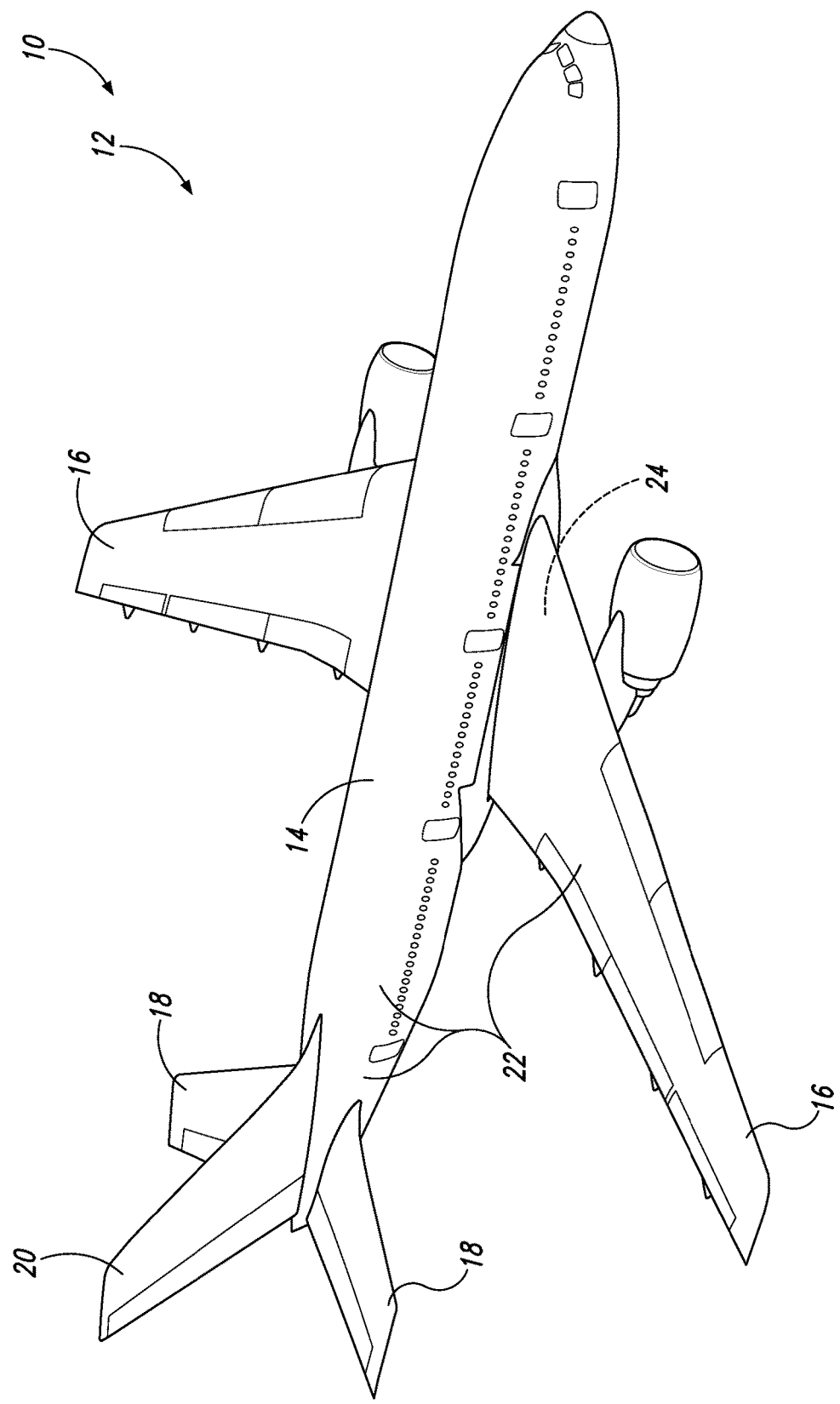
FIG. 1 is a perspective view of an illustrative, non-exclusive example of an aircraft that may include one or more parts manufactured using tooling, systems, and/or methods according to the present disclosure.

Tooling (also referred to, herein, as tools), systems, and related methods for manufacturing composite parts are disclosed herein. Such presently disclosed tooling, systems, and methods may be used in manufacturing composite parts, such as may be components of aircraft or other large vehicles or apparatus. In some examples, such tooling, systems, and/or methods may be used in manufacturing a composite part for an apparatus, such as apparatus 10, as schematically illustrated in FIG. 1. For example, apparatus 10 may include one or more composite parts 22 manufactured using tooling, systems, and/or methods according to the present disclosure.

Apparatus 10 may be provided in the form of a passenger aircraft 12; however, other apparatuses 10 are within the scope of the present disclosure, and the present disclosure is not limited to aircraft and aircraft applications. For example, as illustrative, non-exclusive examples, other apparatuses 10 that may be constructed using (or include parts constructed using) tooling, systems, and/or methods according to the present disclosure include (but are not limited to) watercraft, land vehicles, spacecraft, automobiles, military vehicles, and/or any other apparatus. Moreover, aircraft 12 may take any suitable form, including commercial aircraft, military aircraft, private aircraft, or any other suitable aircraft. While FIG. 1 illustrates aircraft 12 in the form of a fixed wing aircraft, other types and configurations of aircraft are within the scope of aircraft 12 according to the present disclosure, including (but not limited to) helicopters.

Aircraft 12 may include a fuselage 14, which also may be referred to herein as a barrel 14, and which generally corresponds to the main body of aircraft 12 for holding passengers, crew, cargo, and/or equipment, for example, depending on the particular configuration and/or function of an aircraft 12. Typically, although not required, the fuselage 14 of an aircraft 12 is elongate and somewhat cylindrical or tubular. In some embodiments, the fuselage 14 may be constructed of multiple sections that are longitudinally spaced along the fuselage 14 and operatively coupled together to define the fuselage 14.

Aircraft 12 also may include wings 16, horizontal stabilizers 18, and a vertical stabilizer 20, each of which may be constructed as a unitary structure or in subsections that are subsequently assembled together. One or more of fuselage 14, a wing 16, a horizontal stabilizer 18, a vertical stabilizer 20 or a structural subsection thereof may include a composite part 22 constructed using tooling, systems, and/or methods according to the present disclosure. For example, an aircraft fuel system (which may, for example, be located in or adjacent fuselage 14 and/or wings 16) may include one or more composite parts 22 manufactured using presently disclosed tooling, systems, and/or methods. In some examples, composite part 22 may be a duct having a tubular portion and one or more radially extending flanges formed integrally with the tubular portion. In one specific example, composite part 22 may be a pressure pan 24 for a fuel line in aircraft 12. Presently disclosed tooling, systems, and methods may improve manufacturability, improve quality of resulting composite parts 22, eliminate wrinkles in resulting composite parts 22, reduce manufacturing costs, improve ergonomics for the manufacturing process, reduce manufacturing time, and/or otherwise may improve manufacturing processes for such composite parts 22, as compared to conventional methods and systems.

FIGS. 2-6 illustrate systems 30 and tools 32 for manufacturing a composite part according to the present disclosure, in schematic form. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a given example without departing from the scope of the present disclosure.

Figure 2:
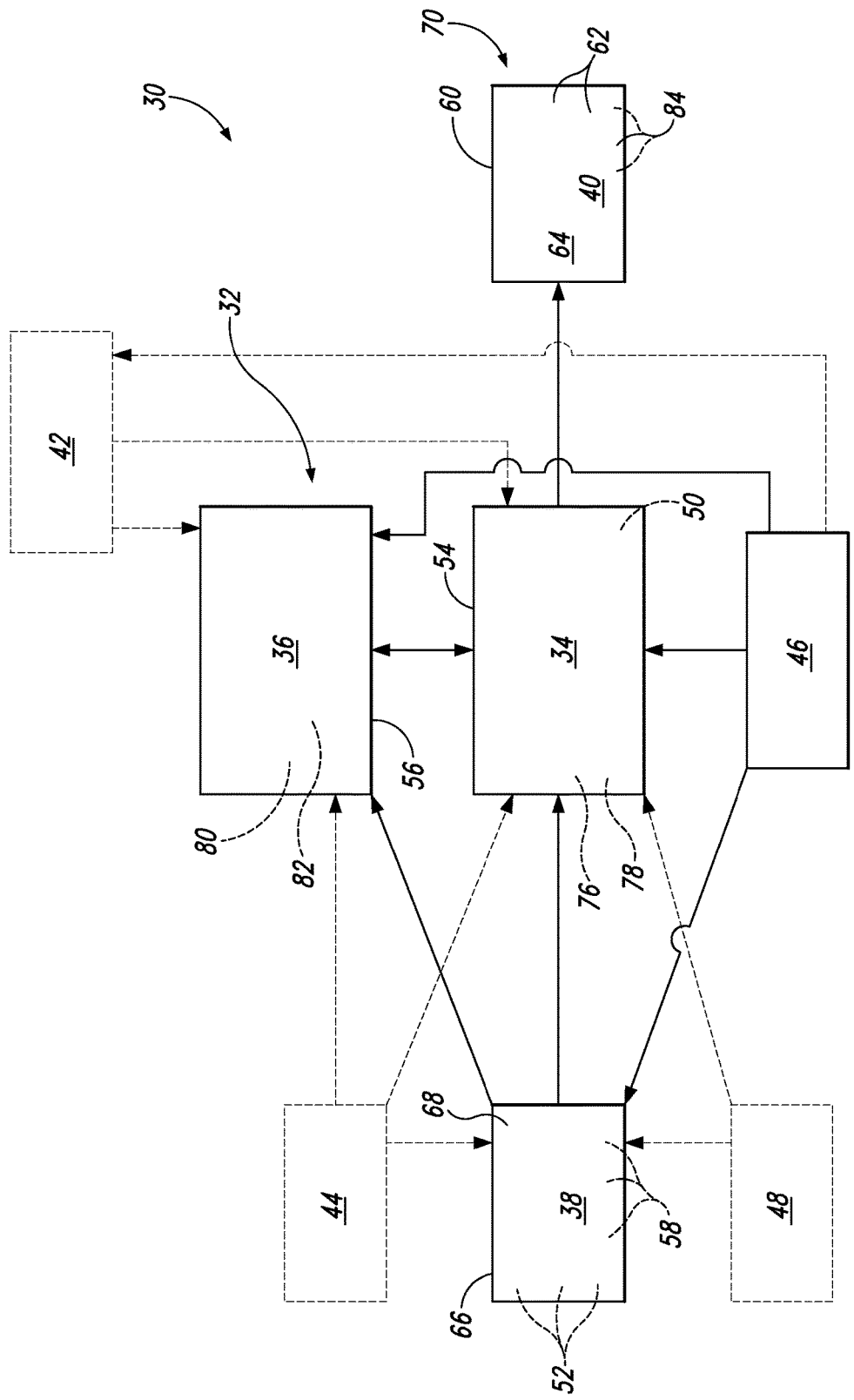
FIG. 2 is a schematic representation of illustrative, non-exclusive examples of systems for manufacturing a composite part, according to the present disclosure.

As illustrated in FIG. 2, systems 30 for manufacturing a composite part 40 (which may be an example of composite part 22) generally may include a tool 32, a composite material 38 for forming composite part 40, a cover 42, a vacuum bag 44, a vacuum device 46, and/or a heat source 48. Tool 32 may include a first tool piece 34 and a second tool piece 36. System 30 may be operable such that composite material 38 may be applied to tool 32 (e.g., to first tool piece 34 and second tool piece 36) and cured on tool 32 (e.g., by drawing a vacuum using vacuum device 46 and/or applying heat using heat source 48), in order to produce composite part 40, which may be removed from tool 32 after curing. Composite part 40 may be a finished composite part, or further finishing operations may be performed on composite part 40 before and/or after removal from tool 32.

First tool piece 34 may include a first composite material-receiving surface 54, and second tool piece 36 may include a second composite material-receiving surface 56. In use, composite material 38 may be configured to be placed on first composite material-receiving surface 54 and second composite material-receiving surface 56, and vacuum device 46 may be configured to draw a vacuum on tool 32, thereby pressing composite material 38 against first composite material-receiving surface 54 and second composite material-receiving surface 56. In this manner, composite material 38 may be placed such that it conforms to first composite material-receiving surface 54 and second composite material-receiving surface 56 (e.g., composite material 38 may be flexible and applied to tool 32 such that it lays against and follows the contours and shape of first composite material-receiving surface 54 and second composite material-receiving surface 56), which may cause composite material 38 to take the shape defined by tool 32 when the material is cured while being held or pressed in that configuration, thereby resulting in a formed composite part 40 once composite material 38 has been cured (e.g., hardened). In turn, first composite material-receiving surface 54 and second composite material-receiving surface 56 may be configured to receive composite material 38 configured to form composite part 40.

Composite material 38 may include, for example, one or more pieces of fabric (e.g., woven or non-woven fabric), such as carbon fiber, fiberglass, aramid, and/or any fiber or polymer material. In some examples, composite material 38 may include a fabric or other material that is pre-impregnated with a polymer, such as a resin. In some examples, a resin or other polymer may be applied to or added to a fabric material in order to form composite material 38.

Such composite materials 38 may be flexible and configured to be customizable for a given application. For example, composite material 38 may be shaped (e.g., cut into various shapes and sizes of fabric) as desired for placement on tool 32. Thus, composite material 38 may be configured to be placed onto tool 32 such that it is caused to conform to (e.g., takes the shape of) first composite material-receiving surface 54 and second composite material-receiving surface 56. In some examples, composite material 38 may include a plurality of layers 52 of composite material 38 that may be placed on tool 32. For example, a plurality of layers 52 may be arranged on first composite material-receiving surface 54 and second composite material-receiving surface 56 in an overlapping configuration such that one or more respective layers 52 may be placed such that they overlap at least a portion of one or more other respective layers 52. In some examples, composite material 38 may include a plurality of pieces 58 of composite material 38, where each respective piece of the plurality of pieces 58 is shaped to be configured to engage with one or more other respective pieces of the plurality of pieces 58 of composite material 38, first composite material-receiving surface 54, and/or second composite material-receiving surface 56. Furthermore, composite material 38 may include a plurality of layers (or "plies") of composite material, with each layer being formed of one or more pieces 58 of composite material 38. When composite material 38 is cured while being retained in a configuration conforming to tool 32, it hardens into that shape defined by tool 32 and substantially may remain in that hardened shape after removal from tool 32. In other words, tool 32 may serve as a mold for forming composite part 40.

In order to cure composite material 38 in place on tool 32, vacuum bag 44 may be positioned with respect to tool 32 and composite material 38. For example, vacuum bag 44 may be configured to be placed on tool 32, thereby enveloping at least a portion of tool 32 and composite material 38 therein. Vacuum bag 44 may be coupled to vacuum device 46 such that vacuum device 46 may draw a vacuum, thereby causing vacuum bag 44 to press against composite material 38 such that composite material 38 is pressed against tool 32 (e.g., against first composite material-receiving surface 54 and second composite material-receiving surface 56), thereby applying pressure to compact composite material 38. Vacuum bag 44 may comprise a polymer film vacuum bag that is flexible and configured to be conformable to the contours of tool 32. In some examples, vacuum bag 44 may comprise an elastomer (e.g., silicone). In specific examples, vacuum bag 44 may comprise an elastomeric vacuum tool that is custom-formed to be specifically shaped to be configured for use with tool 32. Heat source 48 may be positioned and configured to apply heat to tool 32 and/or composite material 38 while it is being cured (e.g., while vacuum device 46 is drawing a vacuum on composite material 38 and tool 32). In some examples, heat source 48 may apply both heat and pressure. For example, heat source 48 may be an autoclave that the entire tool 32 is placed inside of for curing. In some examples, heat source 48 may not be included, and composite material 38 may be allowed to cure at room temperature.

The resulting composite part 40 may include a part outer surface 60 and a part inner surface 62. Part outer surface 60 may define an exterior portion 70 of composite part 40. Part inner surface 62 may define a hollow interior space 64 inside composite part 40. Composite part 40 may be formed on tool 32 such that part outer surface 60 is engaged with first composite material-receiving surface 54 and second composite material-receiving surface 56 of tool 32. For example, composite material 38 may include a material outer surface 66 and a material inner surface 68, where material outer surface 66 becomes and corresponds to part outer surface 60, and material inner surface 68 becomes and corresponds to part inner surface 62. Thus, composite material 38 may be placed on tool 32 such that material outer surface 66 may be placed on first composite material-receiving surface 54 and second composite material-receiving surface 56, while material inner surface 68 may face radially inward, away from first composite material-receiving surface 54 and second composite material-receiving surface 56. Furthermore, a portion of the resulting composite part 40 (e.g., exterior portion 70 of composite part 40) may conform to first composite material-receiving surface 54 and second composite material-receiving surface 56, due to composite material 38 being caused to conform to the same and hardening in that configuration. Composite part 40 may additionally conform to other surfaces of tool 32. For example, first tool piece 34 may include a first flange surface 76 and a second flange surface 78, while second tool piece 36 may include a third flange surface 80 and a fourth flange surface 82. One or more portions of composite part 40 (e.g., one or more flanges 84) may conform to first flange surface 76, second flange surface 78, third flange surface 80, and/or fourth flange surface 82.

In some examples, composite material 38 may be placed on tool 32 such that material outer surface 66 may be in direct contact with first composite material-receiving surface 54 and second composite material-receiving surface 56. As used herein, contact is considered to be "direct" even if a coating or other material is placed between the composite material and tool, such as to facilitate removal of the cured composite material from the tool surfaces. Thus, part outer surface 60 may be in direct contact with first composite material-receiving surface 54 and second composite material-receiving surface 56 when composite material 38 is hardened into composite part 40. Vacuum bag 44 may be positioned interior to material inner surface 68 (and therefore may be positioned interior to part inner surface 62 when composite material 38 hardens to composite part 40). In other words, material outer surface 66 (and resulting part outer surface 60) may be oriented radially outward from a longitudinal part axis 72 (see FIG. 7) of composite part 40, and material inner surface 68 (and resulting part inner surface 62) may be oriented radially inward, facing the longitudinal part axis, which may correspond to a longitudinal tool axis 74 (FIGS. 3-6). In this configuration, vacuum bag 44 may be positioned against material inner surface 68 (e.g., within hollow interior space 64 of resulting composite part 40), and may press against material inner surface 68, thereby causing material outer surface 66 to press against tool 32 when a vacuum is drawn.

FIGS. 3-6 illustrate tools 32 for manufacturing a composite part according to the present disclosure, in schematic form. Tools 32 may be formed of any suitable material, which may include metals such as titanium, aluminum, invar, steel, stainless steel, and/or combinations thereof, composite materials, polymers, glass, ceramics, and/or any other materials that may be configured to be rigid enough to mold a composite part and withstand pressure that may be applied during the curing process. As best seen in FIG. 3, first composite material-receiving surface 54 may extend longitudinally from first flange surface 76 to second flange surface 78, along longitudinal tool axis 74, and second composite material-receiving surface 56 may extend longitudinally from third flange surface 80 to fourth flange surface 82. Axially, first composite material-receiving surface 54 may extend from a first edge 108 to a second edge 110, and second composite material-receiving surface 56 may extend from a third edge 112 to a fourth edge 114. First tool piece 34 may be arranged such that first flange surface 76 is opposite second flange surface 78, and second tool piece 36 may be arranged such that third flange surface 80 is opposite fourth flange surface 82. First flange surface 76 and second flange surface 78 may be parallel to one another in some examples, and may be arranged at a non-parallel angle to one another in other examples. Similarly, third flange surface 80 and fourth flange surface 82 may be parallel to one another in some examples, and may be arranged at a non-parallel angle to one another in other examples. First flange surface 76, second flange surface 78, third flange surface 80, and/or fourth flange surface 82 may be planar in some examples.

Figure 6:
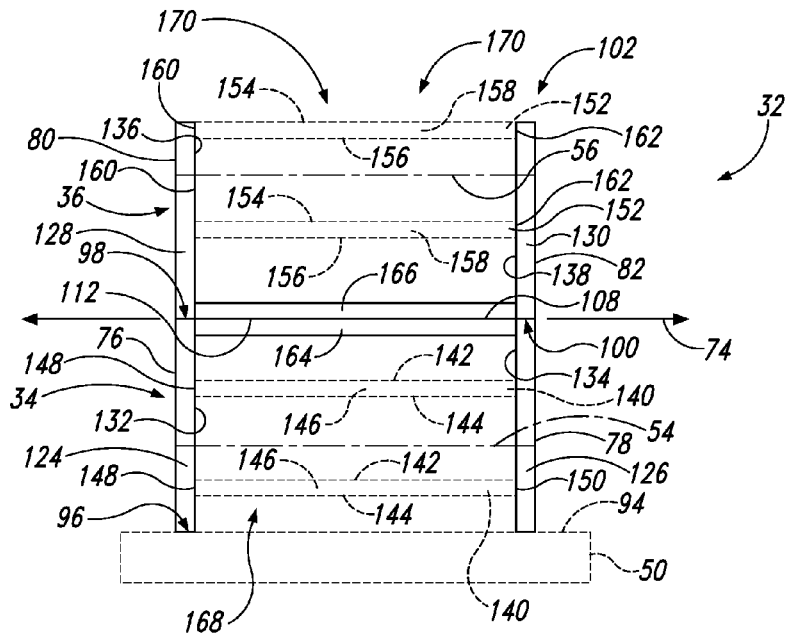
FIG. 6 is a schematic representation of illustrative, non-exclusive examples of tools for manufacturing a composite part, according to the present disclosure, shown from a side elevation view.

Tool 32 may be configured to be selectively movable between a closed position (FIGS. 4 and 6) and an open position (FIGS. 3 and 5). As shown in FIGS. 4 and 6, in the closed position, second tool piece 36 may be positioned adjacent first tool piece 34. In the closed position, first tool piece 34 and second tool piece 36 may be coupled together and/or in contact with one another. In some examples, tool 32 may be configured such that first flange surface 76 and third flange surface 80 are substantially parallel to one another and/or substantially flush with one another in the closed position. In some examples, tool 32 may be configured such that second flange surface 78 and fourth flange surface 82 are substantially parallel to one another and/or substantially flush with one another in the closed position. As best seen in FIG. 4, first composite material-receiving surface 54 and second composite material-receiving surface 56 may be arranged facing one another in the closed position, thereby defining a tool space 86 in which a composite part (e.g., composite part 40) may be formed. Longitudinal tool axis 74 may extend through the center of tool space 86, in a direction from first flange surface 76 towards second flange surface 78. In some examples, tool space 86 may be a negative space that is substantially tubular in shape (e.g., first composite material-receiving surface 54 and second composite material-receiving surface 56 may be curved, such that they form an arced shape between their respective edges). In some examples, composite material 38 may be placed such that it extends through tool space 86, from first flange surface 76 to second flange surface 78, and from third flange surface 80 to fourth flange surface 82.

As seen in FIGS. 3 and 5, in an open position, at least a portion of second tool piece 36 may be spaced apart from first tool piece 34. As shown in FIG. 3, second tool piece 36 may be selectively removable from first tool piece 34, such that the entire second tool piece 36 may be spaced apart from first tool piece 34 when tool 32 is open. As shown in FIG. 5, second tool piece 36 may be selectively movable with respect to first tool piece 34 (e.g., second tool piece 36 may be pivotable about a hinge or other joint 88 that is operatively coupled to first tool piece 34 and second tool piece 36) such that a portion 90 of second tool piece 36 remains adjacent first tool piece 34 in an open configuration, and a second portion 91 of second tool piece 36 is spaced apart from first tool piece 34 in an open configuration. Joint 88 may be configured to enable selective pivoting of second tool piece 36 towards and/or away from first tool piece 34, about joint 88, such as in the directions indicated by arrow 92, however, other configurations and modes of movement are also within the scope of the present disclosure.

In some examples, first tool piece 34 may remain relatively stationary, while second tool piece 36 is selectively moved. For example, second tool piece 36 may be selectively moveable from a first position, corresponding to tool 32 being in the closed configuration (FIGS. 4 and 6), to one or more different second positions, corresponding to tool 32 being in an open configuration (FIGS. 3 and 5). Second tool piece 36 may be movable to a plurality of different second positions (e.g., moved closed or farther away from first tool piece 34), all of which may correspond to tool 32 being in an open configuration. In some examples, in an open position, second composite material-receiving surface 56 may be spaced apart from first composite material-receiving surface 54. Additionally or alternatively, in open positions, third flange surface 80 may be spaced apart from first flange surface 76, and/or fourth flange surface 82 may be spaced apart from second flange surface 78. In some examples, in the closed position, first edge 108 of first composite material-receiving surface 54 may be positioned adjacent third edge 112 of second composite material-receiving surface 56, and/or second edge 110 of first composite material-receiving surface 54 may be positioned adjacent fourth edge 114 of second composite material-receiving surface 56. In the open position, first edge 108 of first composite material-receiving surface 54 may be spaced apart from third edge 112 of second composite material-receiving surface 56, and/or second edge 110 of first composite material-receiving surface 54 may be spaced apart from fourth edge 114 of second composite material-receiving surface 56.

First flange surface 76 may be spaced a first distance from second flange surface 78 adjacent first edge 108 of first composite material-receiving surface 54 and a second distance from second flange surface 78 adjacent second edge 110 of first composite material-receiving surface 54. In some examples, the first distance and the second distance may be approximately equal to each other (e.g., first flange surface 76 may be substantially parallel to second flange surface 78). In other examples, the first distance may be greater than the second distance, or the second distance may be greater than the first distance (e.g., first flange surface 76 and second flange surface 78 may be arranged at a non-parallel angle to one another). The first distance may be defined by (e.g., equal to) a first length 116 of first edge 108, and the second distance may be defined by a second length 118 of second edge 110. Similarly, third flange surface 80 may be spaced a third distance from fourth flange surface 82 adjacent third edge 112 of second composite material-receiving surface 56, and may be spaced a fourth distance from fourth flange surface 82 adjacent fourth edge 114 of second composite material-receiving surface 56. In some examples, the third distance and the fourth distance may be approximately equal to each other (e.g., third flange surface 80 may be substantially parallel to fourth flange surface 82). In other examples, the third distance may be greater than the fourth distance, or the fourth distance may be greater than the third distance (e.g., third flange surface 80 and fourth flange surface 82 may be arranged at a non-parallel angle to one another). The third distance may be defined by a third length 120 of third edge 112, and the fourth distance may be defined by a fourth length 122 of fourth edge 114.

Tool 32 may include a base 50, which may be configured to support first tool piece 34 and/or second tool piece 36. Base 50 may include a planar surface 94 arranged adjacent first tool piece 34, on which first tool piece 34 is supported and/or base 50 may be configured to provide a sealing surface for a vacuum bag. In some examples, first tool piece 34 may be coupled to based 50 (e.g., to planar surface 94) and/or first tool piece 34 may be separable from base 50 in some examples. Base 50 may comprise the same material or materials as tool 32, and/or base 50 may comprises different materials from tool 32. In some examples, first tool piece 34 may be formed integrally with base 50 (e.g., first tool piece 34 may be coupled permanently to base 50 and/or formed of the same material at first tool piece 34). In some examples, first tool piece 34 may be positioned with respect to base 50 such that first flange surface 76 and/or second flange surface 78 are substantially perpendicular to planar surface 94. In some examples, first tool piece 34 may be positioned with respect to base 50 such that first flange surface 76 and/or second flange surface 78 are arranged at a non-perpendicular angle to planar surface 94. A first lower portion 96 of first tool piece 34 may be positioned adjacent base 50, while an opposite, first upper portion 98 of first tool piece 34 may be positioned adjacent second tool piece 36 when tool 32 is in the closed position. Similarly, a second lower portion 100 of second tool piece 36 may be positioned adjacent first tool piece 34 (e.g., adjacent upper portion 98 of first tool piece 34) when tool 32 is in the closed position, and a second upper portion 102 of second tool piece 36 may be opposite second lower portion 100.

As best seen in FIG. 4, tool 32 may form a first perimeter 104, first perimeter 104 being defined by first composite material-receiving surface 54 and second composite material-receiving surface 56. In the closed position of FIG. 4, first perimeter 104 may be substantially continuous. In open positions, such as shown in FIGS. 3 and 5, first perimeter 104 may be non-continuous, due to first composite material-receiving surface 54 and second composite material-receiving surface 56 being spaced apart from each other when tool 32 is in an open position. In some examples, first perimeter 104 may be substantially circular, and adjacent first flange surface 76 and third flange surface 80. Similarly, a second perimeter 106 may be formed by first tool piece 34 and second tool piece 36 on the opposite side of the pieces, adjacent second flange surface 78 and fourth flange surface 82. Second perimeter 106 may be substantially circular, or may be any other shape, such as elliptical, oval, polygonal, etc. Similarly, first perimeter 104 may be elliptical, oval, polygonal, or any other suitable shape in various examples.

As shown in FIG. 6, first tool piece 34 may include a first flange plate 124 and a second flange plate 126, and second tool piece 36 may include a third flange plate 128 and a fourth flange plate 130. First flange plate 124 may define first flange surface 76 as well as a first inner surface 132. Second flange plate 126 may define second flange surface 78 as well as a second inner surface 134. Third flange plate 128 may define third flange surface 80 and a third inner surface 136. Fourth flange plate 130 may define fourth flange surface 82 and a fourth inner surface 138. First flange plate 124 and second flange plate 126 may be arranged such that first inner surface 132 and second inner surface 134 face each other. Similarly, third flange plate 128 and fourth flange plate 130 may be arranged such that third inner surface 136 and fourth inner surface 138 face each other.

Tool 32 may include a plurality of first spacer plates 140 positioned between first flange plate 124 and second flange plate 126. Some or all of first spacer plates 140 may extend substantially from first flange plate 124 to second flange plate 126. Some or all of first spacer plates 140 may extend just a portion of the distance between first flange plate 124 and second flange plate 126. Each first spacer plate 140 may include a first upper surface 142 and an opposite first lower surface 144, first upper surface 142 being separated from first lower surface 144 by a first thickness defining a first coupling surface 146 extending around the perimeter of each first spacer plate 140. In some examples, a first portion 148 of first coupling surface 146 may be coupled to first inner surface 132 and/or a second portion 150 of first coupling surface 146 may be coupled to second inner surface 134. First portion 148 may be welded or otherwise coupled to first inner surface 132 of first flange plate 124 and/or second portion 150 may be welded or otherwise coupled to second inner surface 134 of second flange plate 126.

Similarly, tool 32 may include a plurality of second spacer plates 152 positioned between third flange plate 128 and fourth flange plate 130. Some or all of second spacer plates 152 may extend substantially from third flange plate 128 to fourth flange plate 130. Some or all of second spacer plates 152 may extend just a portion of the distance between third flange plate 128 and fourth flange plate 130. Each second spacer plate 152 may include a second upper surface 154 and an opposite second lower surface 156, second upper surface 154 being separated from second lower surface 156 by a second thickness defining a second coupling surface 158 extending around the perimeter of each second spacer plate 152. In some examples, a third portion 160 of second coupling surface 158 may be coupled to third inner surface 136 and/or a fourth portion 162 of second coupling surface 158 may be coupled to fourth inner surface 138. Third portion 160 may be welded or otherwise coupled to third inner surface 136 of third flange plate 128 and/or fourth portion 162 may be welded or otherwise coupled to fourth inner surface 138 of fourth flange plate 130.

Tool 32 may include one or more fastening plates for securing and/or aligning first tool piece 34 to second tool piece 36. For example, a first fastening plate 164 may be coupled to first tool piece 34 and a second fastening plate 166 may be coupled to second tool piece 36. First fastening plate 164 and second fastening plate 166 may be configured to be selectively coupled together, thereby at least partially securing tool 32 in the closed position. In order to move tool 32 to an open position, first fastening plate 164 may be spaced apart from second fastening plate 166 in some examples. First fastening plate 164 and second fastening plate 166 may be selectively coupled together using one or more suitable fasteners (e.g., one or more pins, bolts, screws, rivets, etc.). In some examples, first fastening plate 164 and second fastening plate 166 may be hinged together. First fastening plate 164 may include a plurality of first fastening plates, and may be positioned anywhere on first tool piece 34, such as adjacent first upper portion 98 of first tool piece 34. Similarly, second fastening plate 166 may include a plurality of second fastening plates, and may be positioned anywhere on second tool piece 36, such as adjacent second lower portion 100 of second tool piece 36.

In some examples, a first fastening plate 164 may be positioned adjacent first edge 108 and/or second edge 110 of first composite material-receiving surface 54. Second fastening plate 166 may be positioned adjacent third edge 112 and/or fourth edge 114 of second composite material-receiving surface 56. Other configurations are also possible. First fastening plate 164 may be positioned between first flange surface 76 and second flange surface 78 (e.g., between first flange plate 124 and second flange plate 126), such as between first inner surface 132 and second inner surface 134. Second fastening plate 166 may be positioned between third flange surface 80 and fourth flange surface 82 (e.g., between third flange plate 128 and fourth flange plate 130), such as between third inner surface 136 and fourth inner surface 138. In some examples, first fastening plate 164 may be coupled to first inner surface 132 and/or second inner surface 134. Similarly, second fastening plate 166 may be coupled to third inner surface 136 and/or fourth inner surface 138. Additionally or alternatively, first fastening plate 164 may be coupled to first flange surface 76 and/or second flange surface 78, and/or second fastening plate 166 may be coupled to third flange surface 80 and/or fourth flange surface 82.

As best seen in FIG. 4, tool 32 may include cover 42, which may be a removable cover 42 that is configured to be placed on tool 32 when tool 32 is in the closed position. For example, removable cover 42 may be configured to be placed on tool 32 such that it at least partially covers a first gap 168 between first flange plate 124 and second flange plate 126 (seen in FIG. 6), and/or such that it at least partially covers a second gap 170 between third flange plate 128 and fourth flange plate 130 (seen in FIG. 6). Removable cover 42 may be configured to engage one or more first spacer plates 140 and/or one or more second spacer plates 152. In other examples, cover 42 may be coupled to tool 32, such as by being welded to or otherwise mechanically coupled to tool 32 to at least partially cover at least some of a plurality of first gaps 168 and/or at least some of a plurality of second gaps 170. In some examples, cover 42 may include a first cover and a second cover, the first cover being coupled to first tool piece 34 and the second cover being coupled to second tool piece 36.

As seen in FIGS. 3-4, first composite material-receiving surface 54 and/or second composite material-receiving surface 56 may include one or more grooves 172. For example, grooves 172 may include one or more longitudinal grooves formed along first composite material-receiving surface 54 and/or second composite material-receiving surface 56, formed along tool space 86 and longitudinal tool axis 74, as shown in FIGS. 3-4. Additionally or alternatively, grooves 172 may include one or more circumferential grooves oriented around longitudinal tool axis 74. Grooves 172 may be configured to receive any excess from composite material 38 applied to tool 32.

Figure 7:
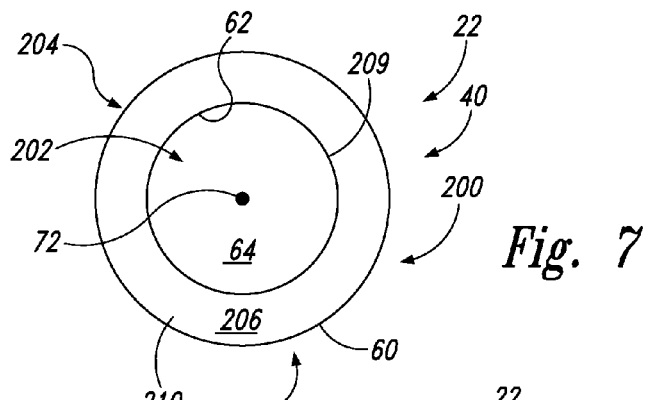
FIG. 7 is a schematic representation of illustrative, non-exclusive examples of composite parts that may be manufactured using tooling, systems, and/or methods according to the present disclosure, shown from an elevation view.
Figure 8:
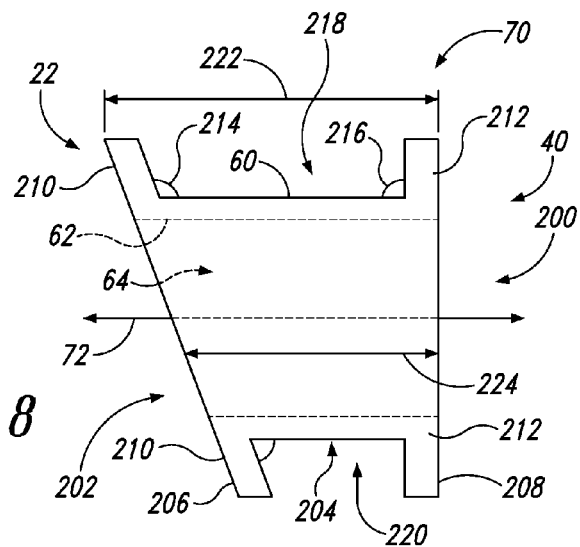
FIG. 8 is a schematic representation of illustrative, non-exclusive examples of composite parts that may be manufactured using tooling, systems, and/or methods according to the present disclosure, shown from a side elevation view.

FIGS. 7-8 illustrate composite parts 40 (which may be examples of composite part 22) in schematic form, which may be manufactured using tools 32 and/or systems 30 according to the present disclosure. FIG. 7 shows a schematic representation of composite part 40 from an elevation view, and FIG. 8 shows a schematic representation of composite part 40 from a side view. Composite part 40 is shown in the form of a flanged duct 200, but many different composite parts 40 may be manufactured using tools 32 and/or systems 30 according to the present disclosure. In some examples, composite part 40 may be a component of an aircraft. For example, composite part 40 may be configured to be coupled to a fuel system of an aircraft, such as being a pressure pan for an aircraft fuel system, through which the aircraft fuel line may pass.

Composite part 40 includes part inner surface 62 and part outer surface 60, where part inner surface 62 defines hollow interior space 64 inside part inner surface 62. For example, part inner surface 62 may define a through-hole 202 extending along longitudinal part axis 72, which may extend through the center of composite part 40. Through-hole 202 may extend through the entire composite part 40, such as in the case of a flanged duct 200. Composite part 40 may include a tubular portion 204 extending from a first part end 206 to a second part end 208, the tubular portion 204 defining through-hole 202 and hollow interior space 64. In other words, tubular portion 204 may be substantially cylindrical, and formed by part outer surface 60 facing radially outward from longitudinal part axis 72 and by part inner surface 62, facing radially inward towards longitudinal part axis 72. Tubular portion 204 may form a first perimeter 209 adjacent first part end 206. For example, first perimeter 209 may be circular or non-circular (e.g., elliptical, oval, polygonal, etc.). Tubular portion 204 may include a corresponding second perimeter adjacent second part end 208, which similarly may be circular, non-circular, elliptical, oval, and/or polygonal in shape. Tubular portion 204 may have a circular perpendicular cross-section, or may have a perpendicular cross-section that is elliptical, oval, polygonal, or any other shape.

Composite part 40 may include one or more flanges, such as a first flange 210 and a second flange 212. First flange 210 and/or second flange 212 may be formed integrally with tubular portion 204. In some examples, first flange 210 may be positioned adjacent first part end 206 and second flange 212 may be positioned adjacent second part end 208. First flange 210 and second flange 212 may be configured to extend radially outward from tubular portion 204 (e.g., radially outward, away from longitudinal part axis 72). First flange 210 and/or second flange 212 may extend radially outward from tubular portion 204 around the entire circumference of tubular portion 204 in some examples. In other examples, first flange 210 and/or second flange 212 may extend radially outward from tubular portion 204 around a portion of the circumference of tubular portion 204.

First flange 210 may form a first flange angle 214 between it and tubular portion 204. In some examples, first flange angle 214 may be approximately 90 degrees, such that first flange 210 is approximately perpendicular to tubular portion 204. In other examples, first flange angle 214 may be acute or obtuse. Similarly, second flange 212 may form a second flange angle 216 between it and tubular portion 204. Second flange angle 216 may be approximately 90 degrees, such that second flange 212 is approximately perpendicular to tubular portion 204. In other examples, second flange angle 216 may be acute or obtuse. First flange angle 214 and/or second flange angle 216 may be substantially constant around the circumference of tubular portion 204 in some examples. In other examples, first flange angle 214 and/or second flange angle 216 may vary around the circumference of tubular portion 204. For example, as shown in FIG. 8, first flange 210 may be angled with respect to tubular portion 204 such that first flange angle 214 may be obtuse adjacent a widened portion 218 of composite part 40, and acute adjacent a narrowed portion 220 of composite part 40.

In some examples, first flange 210 and second flange 212 may be substantially parallel to one another. In other examples, and as shown in FIG. 8, first flange 210 and second flange 212 may be arranged at a non-parallel angle to one another. Thus, a widened distance 222 between first part end 206 and second part end 208 adjacent widened portion 218 may be greater than a narrowed distance 224 between first part end 206 and second part end 208 adjacent narrowed portion 220. Thus, the distance between first part end 206 and second part end 208 may vary around the circumference of tubular portion 204. In other examples (e.g., in examples where first flange 210 and second flange 212 are substantially parallel to one another), the distance between first part end 206 and second part end 208 may be substantially constant around the circumference of tubular portion 204.

When composite part 40 is formed on tool 32, part outer surface 60 may engage and conform to the tool (e.g., part outer surface 60 may engage with and conform to first composite material-receiving surface 54 and second composite material-receiving surface 56 of tool 32). Additionally, composite part 40 may conform to first flange surface 76, second flange surface 78, third flange surface 80, and/or fourth flange surface 82. For example, first flange 210 of composite part 40 may engage with and conform to first flange surface 76 and third flange surface 80 of tool 32, and second flange 212 may engage with and conform to second flange surface 78 and fourth flange surface 82 of tool 32, as composite part 40 is being formed on tool 32. Thus, tool 32 may be configured to define and form a three-dimensional shape of composite part 40.

Turning now to FIGS. 9-17, illustrative non-exclusive examples of tools 32 and systems 30 are illustrated. Where appropriate, the reference numerals from the schematic illustrations of FIGS. 1-8 are used to designate corresponding parts of FIGS. 9-17; however, the examples of FIGS. 9-17 are non-exclusive and do not limit tools 32 or systems 30 to the illustrated embodiments of FIGS. 9-17. That is, tools 32 and systems 30 are not limited to the specific embodiments of the illustrated FIGS. 9-17 and may incorporate any number of the various aspects, configurations, characteristics, properties, etc. of tools 32 and/or systems 30 that are illustrated in and discussed with reference to the schematic representations of FIGS. 1-8 and/or the embodiments of FIGS. 9-17, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to tools 32 and/or systems 30 shown in FIGS. 9-17; however, it is within the scope of the present disclosure that the previously discussed features, variants, etc. may be utilized with each example of tool 32 and/or system 30.

Figure 9:
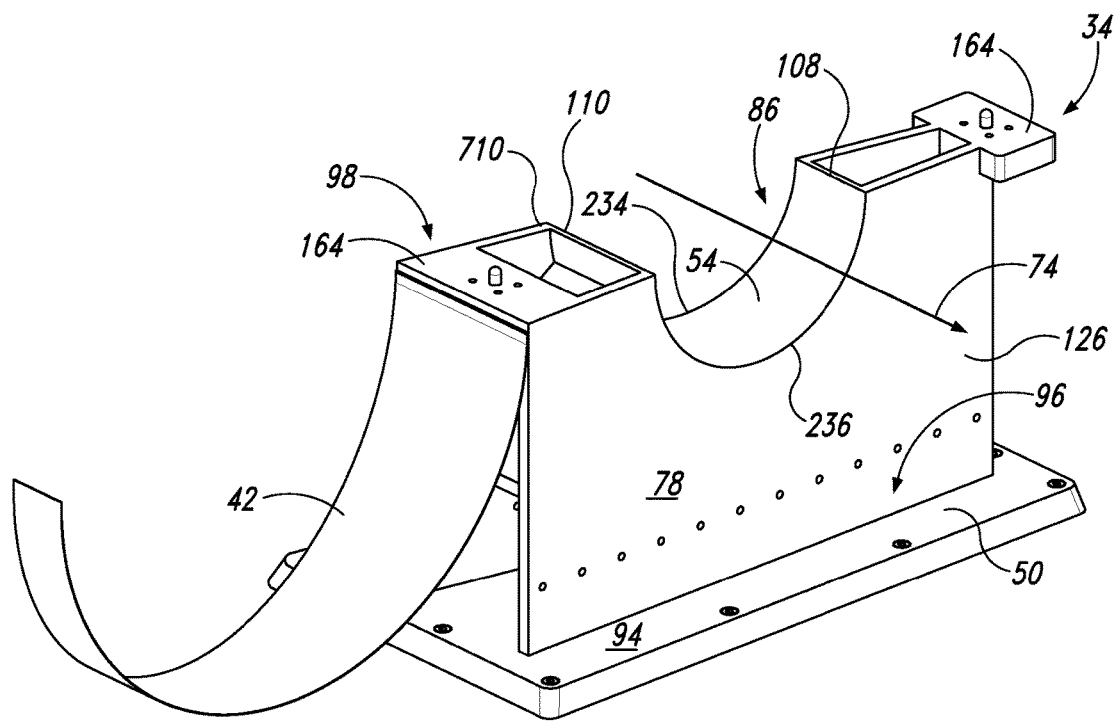
FIG. 9 is a perspective view of one example of a first tool piece according to the present disclosure.
Figure 10:
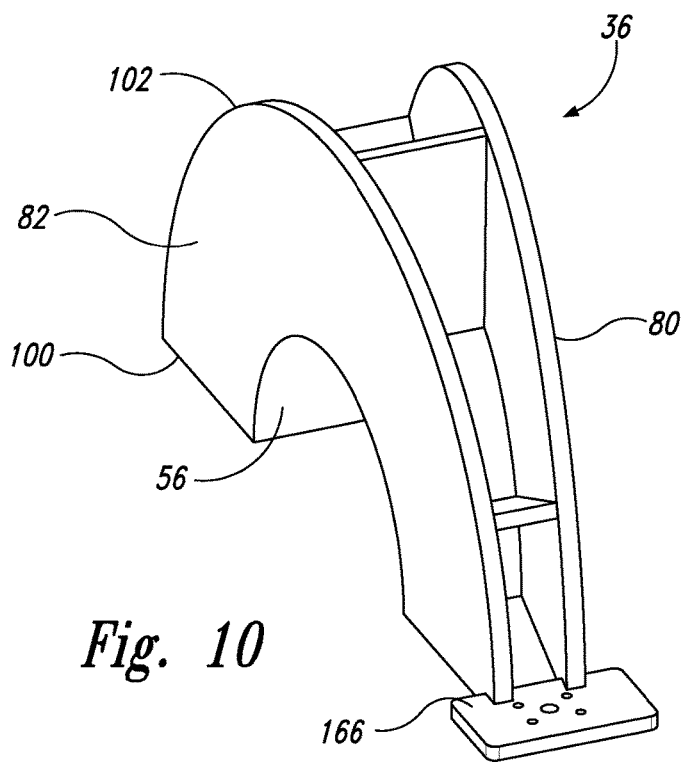
FIG. 10 is a perspective view of one example of a second tool piece according to the present disclosure.
Figure 11:
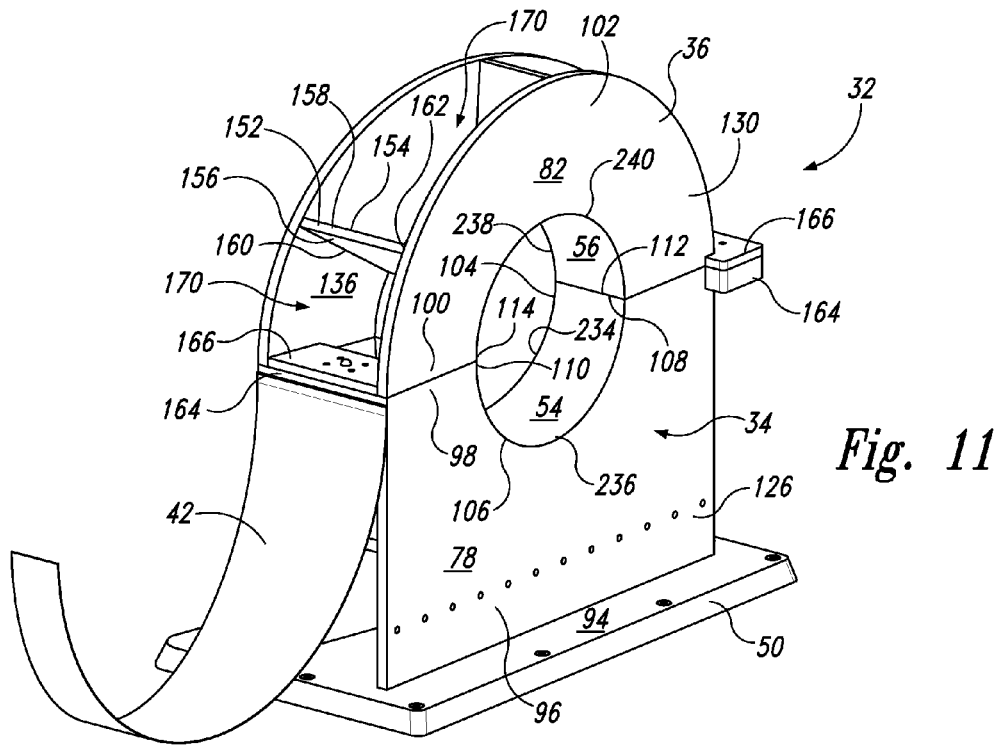
FIG. 11 is a perspective view of the first tool piece of FIG. 9 and the second tool piece of FIG. 10, shown positioned in the closed position.
Figure 12:
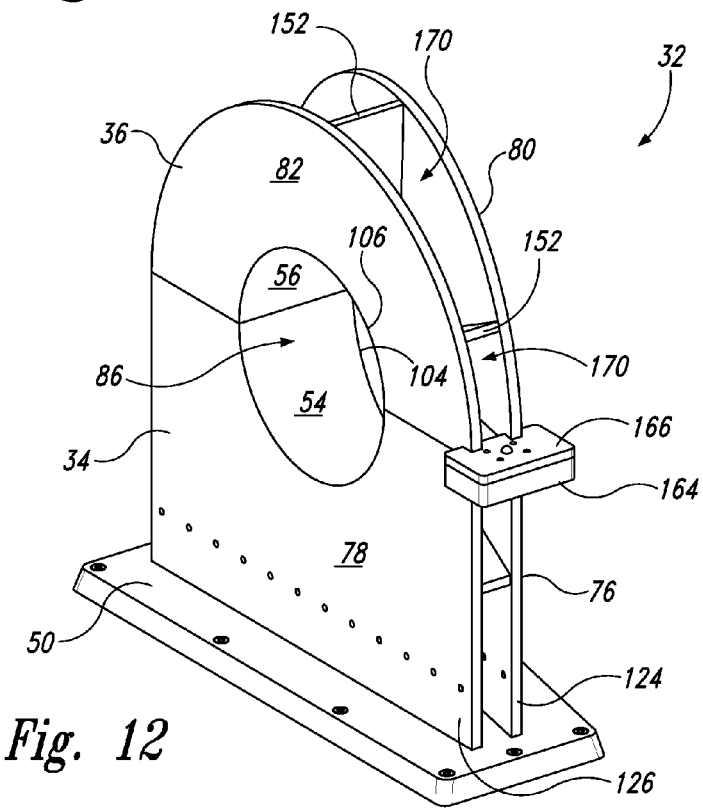
FIG. 12 is a perspective view of one example of a tool according to the present disclosure, in the closed position.

Generally, FIG. 9 shows an example of first tool piece 34, FIG. 10 shows an example of second tool piece 36, and FIG. 11 shows an example of tool 32 in the closed position, with second tool piece 36 positioned adjacent first tool piece 34. FIG. 12 shows an example of tool 32 in the closed position, viewed from a different angle than shown in FIG. 11, and FIG. 13 shows an example of tool 32 in the closed position and viewed from one side of tool 32.

Figures 13, 14:
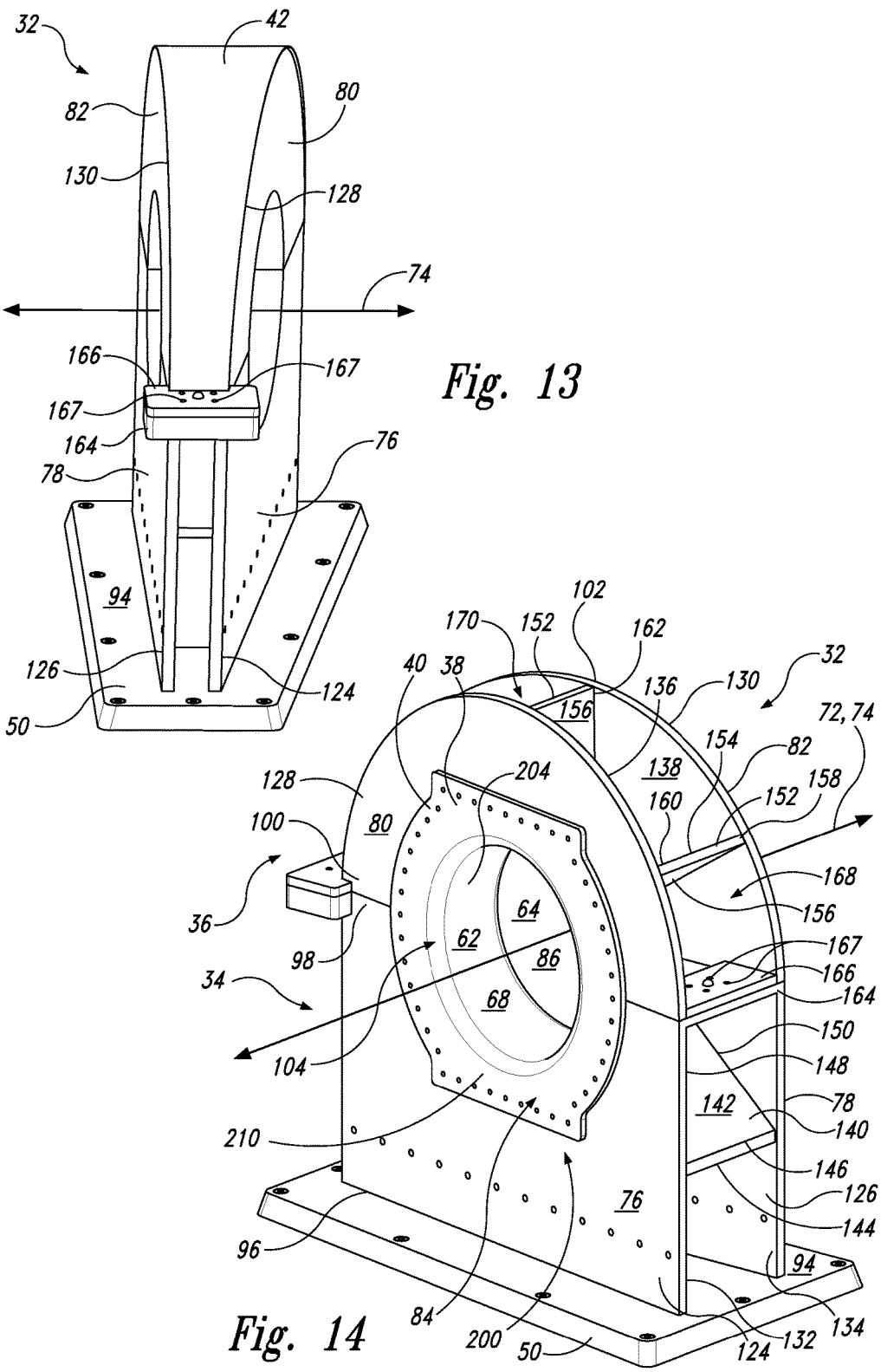
FIG. 13 is a side elevation view of the tool of FIG. 12.
FIG. 14 is a perspective view of one example of a tool according to the present disclosure, with a composite part in place on the tool.

As seen in the examples of FIGS. 9-13, first tool piece 34 (FIGS. 9 and 11-13) may include first flange surface 76, second flange surface 78 opposite first flange surface 76, and first composite material-receiving surface 54 extending from first flange surface 76 to second flange surface 78. Similarly, second tool piece 36 (FIGS. 10-13) may include third flange surface 80, fourth flange surface 82 opposite third flange surface 80, and second composite material-receiving surface 56 extending from third flange surface 80 to fourth flange surface 82. FIGS. 9 and 10 show tool 32 in an open position, with second tool piece 36 (FIG. 10) spaced apart from first tool piece 34 (FIG. 9). FIGS. 11-13 show tool 32 in a closed positioned, with second tool being 36 being positioned adjacent first tool piece 34. As shown in FIGS. 11-13, in the closed position, first flange surface 76 may be substantially parallel to third flange surface 80, and/or second flange surface 78 may be substantially parallel to fourth flange surface 82. Additionally, first composite material-receiving surface 54 may be arranged such that it is facing second composite material-receiving surface 56, thereby defining tool space 86 (FIG. 12) in which a composite part (e.g., composite part 40) may be formed. Longitudinal tool axis 74 (FIG. 13) may extend through the center of tool space 86.

As best seen in FIGS. 11 and 12, in the closed position, tool 32 may form first perimeter 104 and second perimeter 106 surrounding tool space 86. For example, first composite material-receiving surface 54 may form a first male fillet radius 234 at its intersection with first flange surface 76, and second composite material-receiving surface 56 may form a third male fillet radius 238 at its intersection with third flange surface 80. First male fillet radius 234 and third male fillet radius 238 essentially may form a continuous, circular first perimeter 104 in some examples, but other shapes are also possible (e.g., rectangular, elliptical, oval, polygonal, etc.). Similarly, first composite material-receiving surface 54 may form a second male fillet radius 236 at its intersection with second flange surface 78, and second composite material-receiving surface 56 may form a fourth male fillet radius 240 at its intersection with fourth flange surface 82. Second male fillet radius 236 and fourth male fillet radius 240 essentially may form a continuous, circular second perimeter 106 in some examples.

First male fillet radius 234, second male fillet radius 236, third male fillet radius 238, and fourth male fillet radius 240 may allow tool 32 to serve as a mold such that the composite part may be formed around the male fillet radii, rather than being pressed inside a female fillet radius. As compared with conventional tooling and manufacturing techniques, presently disclosed tools 32 and systems 30 may provide an ergonomically simpler method for producing a composite part, such as a flanged duct.

While first flange surface 76 and second flange surface 78 may be parallel in some examples, as shown in FIGS. 9-13, first flange surface 76 may be arranged at a non-parallel angle with respect to second flange surface 78, such that tool 32 is narrower on one side (best seen in FIGS. 12-13) than the other. For example, first composite material-receiving surface 54 may extend from first edge 108 to second edge 110 (best seen in FIG. 9), and first tool piece 54 may be narrower adjacent first edge 108, such that first flange surface 76 is spaced apart from second flange surface 78 a first distance adjacent first edge 108, and spaced apart from second flange surface 78 a second distance adjacent second edge 110, the second distance being greater than the first distance. In other words, the length of first edge 108 (corresponding to the first distance between first flange surface 76 and second flange surface 78) may be less than the length of second edge 110 (corresponding to the second distance between first flange surface 76 and second flange surface 78). A similar configuration may exist with respect to third edge 112 and fourth edge 114 of second composite material-receiving surface 56, with respect to varying distances between third flange surface 80 and fourth flange surface 82.

As best seen in FIG. 11, one or more first fastening plates 164 and one or more second fastening plates 166 may be configured to couple first tool piece 34 to second tool piece 36. First fastening plate 164 may be positioned between first flange plate 124 and second flange plate 126, and second fastening plate 166 may be positioned between third flange plate 128 and fourth flange plate 130, such as shown adjacent second edge 110 of first composite material-receiving surface 54 and fourth edge 114 of second composite material-receiving surface 56 in FIG. 11. For example, first fastening plate 164 may be coupled to first inner surface 132 of first flange plate 124 and second inner surface 134 of second flange plate 126. Similarly, second fastening plate 166 may be coupled to third inner surface 136 of third flange plate 128 and fourth inner surface 138 of fourth flange plate 130. Additionally or alternatively, first fastening plate 164 and/or second fastening plate 166 may be positioned at least partially externally to the flange plates, such as shown adjacent first edge 108 of first composite material-receiving surface 54 and third edge 112 of second composite material-receiving surface 56 in FIG. 11. In some examples, at least a portion of first fastening plate 164 may be coupled to first flange surface 76 and/or second flange surface 78, and/or at least a portion of second fastening plate 166 may be coupled to third flange surface 80 and/or fourth flange surface 82. One or more fasteners 167 (e.g., a bolt, pin, screw, clip, bracket, hinge, rivet, and/or any other suitable fastener) may be used to couple and/or align first fastening plate 164 to second fastening plate 166. Fasteners 167 also may be configured to ensure alignment of first tool piece 34 with second tool piece 36, by virtue of facilitating alignment of first fastening plate 164 with second fastening plate 166.

Figure 15:
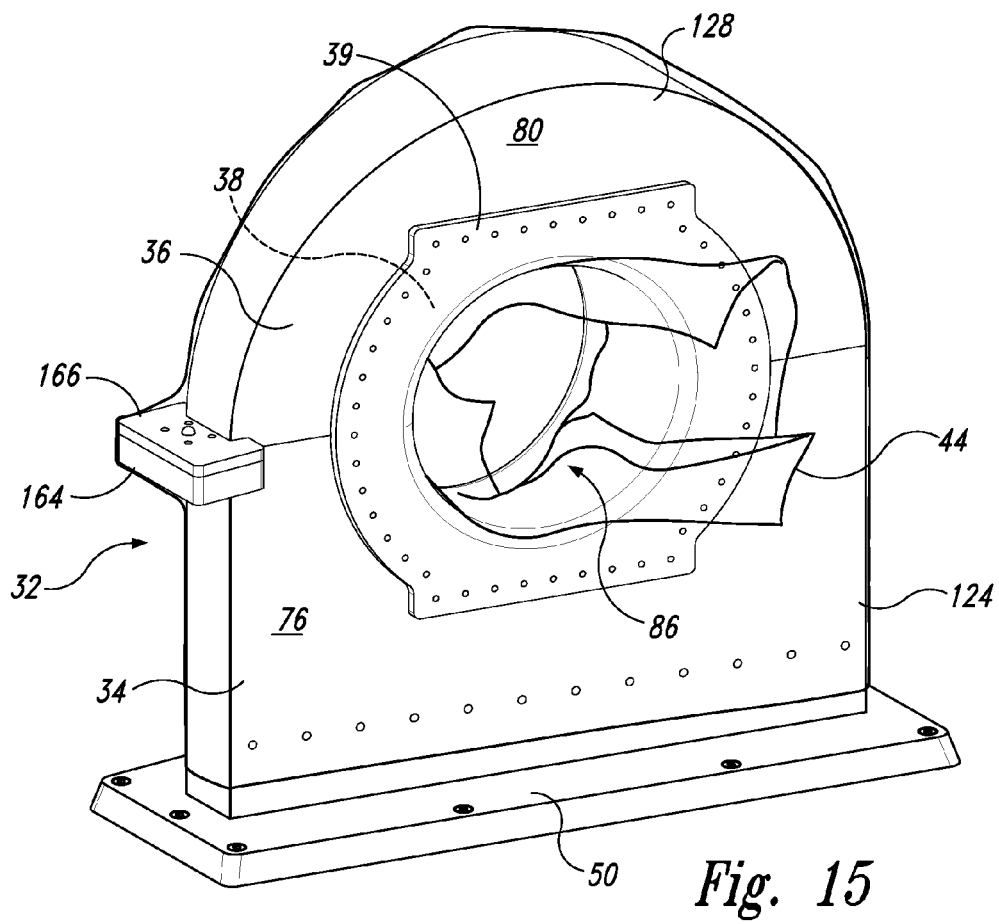
FIG. 15 is a perspective view of one example of a tool according to the present disclosure, in preparation for curing a part being formed on the tool.

FIG. 14 shows a tool 32 in the closed position, with composite material 38 in place on tool 32, in order to form composite part 40. As shown in FIG. 14, composite material 38 may be applied to first composite material-receiving surface 54, second composite material-receiving surface 56, first flange surface 76, second flange surface 78, third flange surface 80, and fourth flange surface 82. Material outer surface 66 of composite material 38 may be placed against first composite material-receiving surface 54 and second composite material-receiving surface 56, thereby forming part outer surface 60 of composite part 40, such as tubular portion 204 of flanged duct 200. Material inner surface 68 may be oriented radially inwards, facing tool space 86, and may form part inner surface 62, defining the internal surface of tubular portion 204. First flange 210 may be formed by portions of composite material 38 placed against first flange surface 76 and third flange surface 80. On the opposite side of tool 32, second flange 212 may be formed by portions of composite material 38 placed against second flange surface 78 and fourth flange surface 82. Thus, composite material 38 may be placed on tool 32 such that it extends through tool space 86, from first flange surface 76 to second flange surface 78 (and from third flange surface 80 to fourth flange surface 82). FIG. 15 shows composite material 38 in place on tool 32, underneath a caul 39, with vacuum bag 44 in place over at least a portion of tool 32. Caul 39 may be formed of a reinforced material, may be semi-flexible, and/or may be of a shape similar to the desired finished composite part. Caul 39 may be placed over the composite material to facilitate conformance of the composite material to tool 32. As shown in FIG. 15, vacuum bag 44 may, at least partially, envelop tool 32 and may extend through tool space 86, such that when a vacuum is drawn, vacuum bag 44 may be pressed against composite material 38 and caul 39, thereby compacting composite material 38 against first flange surface 76, second flange surface 78, third flange surface 80, fourth flange surface 82, first composite material-receiving surface 54, and second composite material-receiving surface 56. While FIG. 15 illustrates a flexible, polymer film vacuum bag 44 other configurations are also possible. For example, instead of a polymer film vacuum bag 44 and caul 39, an elastomeric vacuum bag (also referred to as an elastomeric vacuum tool) may be used to compact composite material 38 against tool 32. In other examples, a flexible, polymer film vacuum bag 44 may be utilized without caul 39.

Returning to FIG. 14, a plurality of first spacer plates 140 may be positioned between first flange plate 124 and second flange plate 126, and a plurality of second spacer plates 152 may be positioned between third flange plate 128 and fourth flange plate 130. Any number of spacer plates may be provided. For example, tool 32 may include at least two, at least three, at least four, at least five, at least six, and/or seven or more first spacer plates 140 and/or second spacer plates 152. Each respective first spacer plate 140 may be spaced apart from each of the other first spacer plates 140, thereby forming first gap 168 between adjacent first spacer plates 140. Similarly, second gap 170 may be formed between each respective adjacent pair of second spacer plates 152. While not shown in FIG. 14, a cover may be configured to engage one or more of first spacer plates 140 and/or second spacer plates 152, such that the cover may be positioned between the flange plates, resting on first spacer plates 140 and/or second spacer plates 152. The cover may be coupled to tool 32, and/or selectively removable therefrom. In some examples, a majority of the volume defined between the flange plates may be hollow, with first spacer plates 140 and second spacer plates 152 being configured to increase stability of tool 32.

Figure 16:
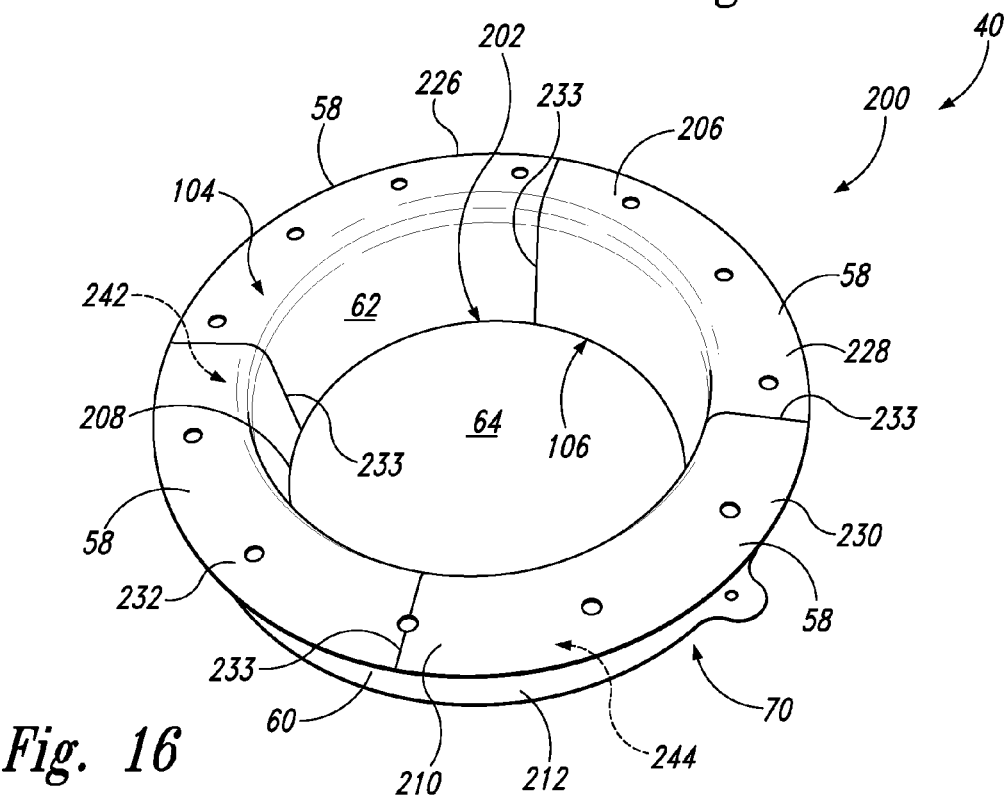
FIG. 16 is a schematic representation of a perspective view of an example of a composite part, showing the shape of pieces of composite material used to form the part.

FIG. 16 shows one example of a composite part 40, in the form of a flanged duct 200, schematically illustrating how composite material 38 may be placed on tool 32 in order to form composite part 40. For example, composite part 40 substantially may be divided into a plurality of approximately equal portions. For example, composite material 38 may be formed into a plurality of pieces 58, each piece 58 being shaped and sized to be approximately corresponding to about a quarter of composite part 40. In one specific example, a first composite piece 226, a second composite piece 228, a third composite piece 230, and a fourth composite piece 232 may be arranged on tool 32 to form one layer (or ply) of composite part 40. Each respective composite piece 58 may be arranged on tool 32 such that a substantially longitudinal splice 233 may be formed between each respective pair of adjacent composite pieces 58 (e.g., between first composite piece 226 and second composite piece 228). For example, each longitudinal splice 233 may extend from first part end 206 to second part end 208 (e.g., across first flange 210, longitudinally along first composite material-receiving surface 54 and/or second composite material-receiving surface 56, and then across second flange 212). Composite part 40 may be formed by compacting a plurality of layers (e.g., 2 or more, 4 or more, 6 or more, 10 or more, 12 or more, 15 or more, 20 or more, or 30 or more layers) of composite material 38, each layer including one or more pieces 58 of composite material 38. While the example illustrated in FIG. 16 shows four pieces 58 per layer of composite material 38, other configurations are possible, having more or fewer pieces 58 of composite material 38 per layer. Furthermore, the splices between adjacent pieces 58 need not be longitudinally oriented, and may be arranged in alternative configurations.

A first inner female fillet radius 242 may be formed around the interface between tubular portion 204 and first flange 210, the first inner female fillet radius 242 being complementary to and formed by, for example, first male fillet radius 234 and third male fillet radius 238 of tool 32. Similarly, a second inner female fillet radius 244 may be formed around the interface between tubular portion 204 and second flange 212, the second inner female fillet radius 244 being complementary to and formed by, for example, second male fillet radius 236 and fourth male fillet radius 240 of tool 32.

Figure 17:
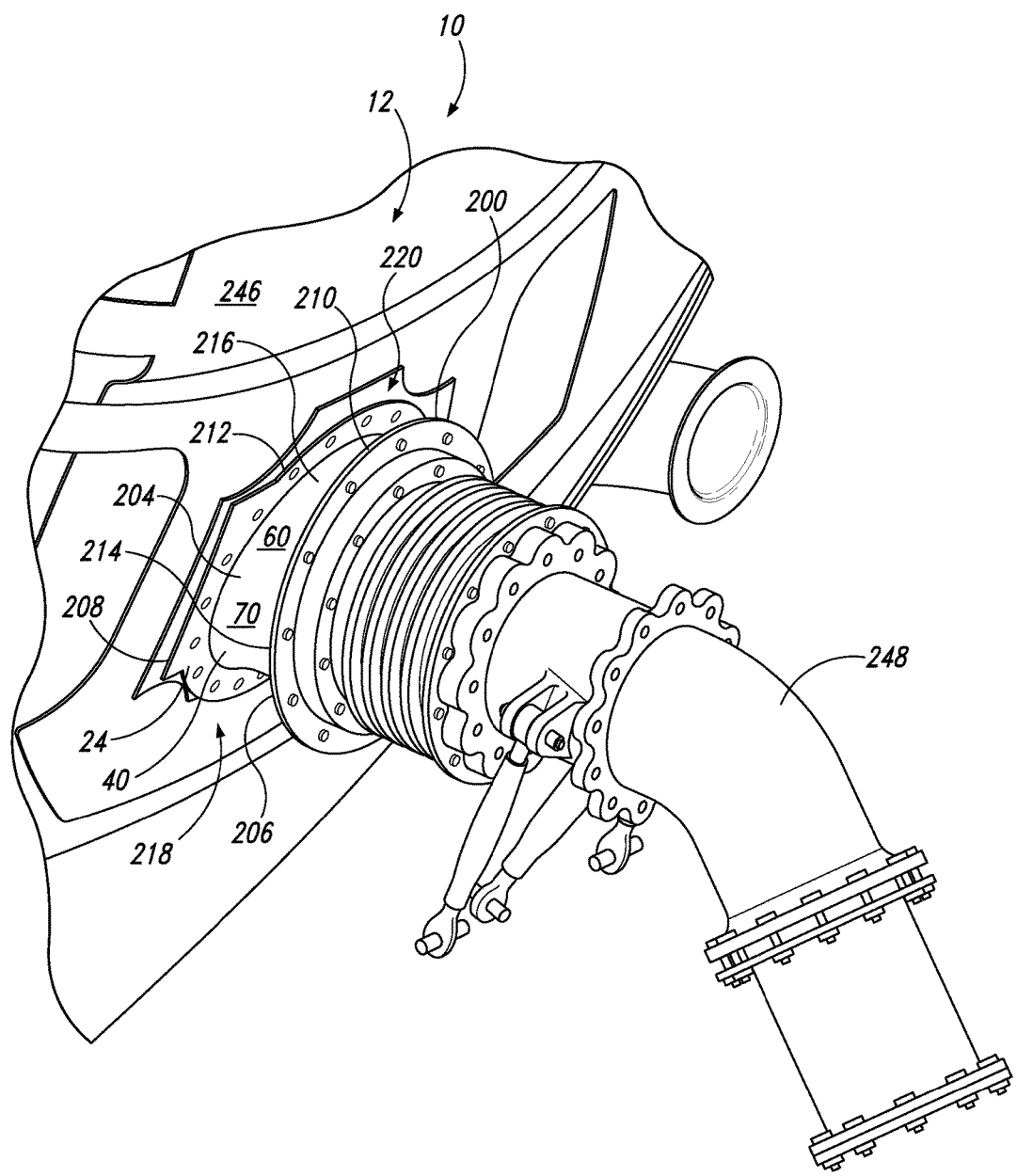
FIG. 17 is a perspective view of one example of a composite part that may be made using systems, tool, and/or methods according to the present disclosure.

FIG. 17 illustrates one example of composite part 40 in the form of a flanged duct 200, in context as it could be used on an aircraft. Flanged duct 200 may serve as a pressure pan 24 for a fuel line 248 of an aircraft 12. For example, pressure pan 24 may function as a coupling between a pressure dome 246 of aircraft 12 and fuel line 248, with the fuel line 248 extending through the center of pressure pan 24. First flange 210 and second flange 212 of pressure pan 24 may serve as mating surfaces, such that first flange 210 engages with fuel line 248 and second flange 212 engages with pressure dome 246. FIG. 17 is illustrative only, and not limiting in terms of applications for composite parts 40 manufactured using presently disclosed tools 32 and/or systems 30.

Figure 18:
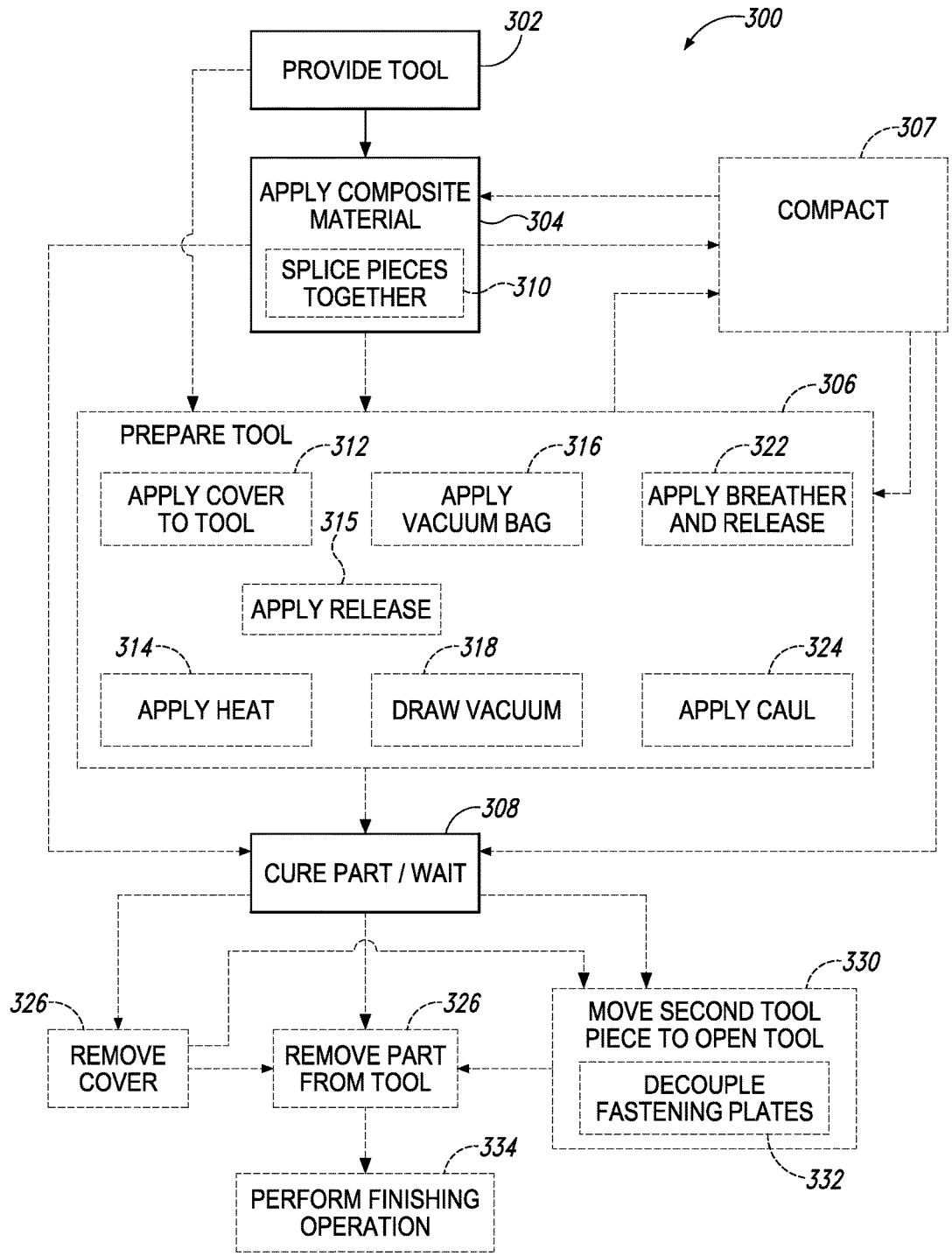
FIG. 18 is a block diagram representing methods of manufacturing a composite part, according to the present disclosure.

FIG. 18 schematically provides a flowchart that represents illustrative, non-exclusive examples of methods 300 according to the present disclosure. In FIG. 18, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 18 are not limiting and other methods and steps are within the scope of the present disclosure, including methods having greater than or fewer than the number of steps illustrated, as understood from the discussions herein.

Methods 300 of forming a composite part (e.g., composite part 22 or composite part 40) using tools (e.g., tool 32) and/or systems (e.g., system 30) according to the present disclosure are also disclosed. Generally, methods 300 may include providing a tool according to the present disclosure at 302, applying a composite material (e.g., composite material 38) at 304 such that the composite material conforms to the shape of the tool (e.g., to first composite material-receiving surface 54, second composite material-receiving surface 56, first flange surface 76, second flange surface 78, third flange surface 80, and/or fourth flange surface 82 of tool 32), preparing the tool at 306, compacting the composite material at 307, and curing the composite material on the tool at 308. In this manner, a composite part may be formed, using the tool as a mold for shaping the part (e.g., defining the three-dimensional shape of the resulting composite part). In some methods 300, applying the composite material to the tool at 304 may include applying the composite material such that a material outer surface (e.g., material outer surface 66) is in direct contact with a first composite material-receiving surface and a second composite material-receiving surface of the tool, where the material outer surface forms a part outer surface (e.g., part outer surface 60) of the resulting composite part. In some methods 300, applying the composite material at 304 may include applying the composite material such that it conforms to a convex radius defined by one or more of the first composite material-receiving surface, the second composite material-receiving surface, a first flange surface, a second flange surface, a third flange surface, and a fourth flange surface (e.g., first male fillet radius 234, second male fillet radius 236, third male fillet radius 238, and fourth male fillet radius 240).

Applying the composite material at 304 may include applying a pre-impregnated composite material and/or applying a plurality of layers of composite material to the tool. In examples where the composite material is not pre-impregnated, applying the composite material at 304 also may include applying a resin and a hardener compound to the composite material. Additionally or alternatively, applying the composite material at 304 may include shaping or forming a piece of composite material (e.g., a woven fabric, such as a fiberglass or carbon fiber fabric) into a plurality of pieces that are shaped to be configured to conform to the tool and align with each other. In this vein, applying composite material at 304 may include splicing two or more piece of composite material together at 310, such as by placing two or more pieces with respect to one another, overlapping a portion of two or more pieces of composite material, and/or causing two or more pieces of composite material to engage with one another.

Applying the composite material at 304 may include applying one or more, two or more, four or more, eight or more, ten or more, and/or 15 or more pieces of composite material to the tool. In one specific example, applying the composite material at 304 may include applying four pieces of composite material to the tool, each piece being approximately equal to about 20-30% of the surface area of the resulting part. Applying the composite material at 304 may also include repeating the applying the composite material at 304, such that a plurality of layers of composite material may be applied to the tool, with each layer being formed from one or more pieces of composite material. Additionally or alternatively, splicing pieces of composite material at 310 may include splicing a plurality of pieces of composite material such that the splices extend longitudinally from a first part end (e.g., first part end 206) to a second part end (e.g., second part end 208) of the resulting composite part (e.g., the plurality of pieces of composite material may be arranged with respect to the tool such that the splices, or the portions of overlap of adjacent pieces of composite material, are substantially aligned with a longitudinal axis of the tool and part). In some examples, applying the composite material at 304 may include applying one or more first pieces of composite material to the tool such that it conforms to the first composite material-receiving surface, the first flange surface, and the second flange surface. Additionally or alternatively, applying the composite material at 304 may include applying one or more second pieces of composite material to the tool such that it conforms to the second composite material-receiving surface, the third flange surface, and the fourth flange surface.

Preparing the tool at 306 may include any steps desired or necessary to prepare the tool such that it is configured for the composite material to be cured in place on the tool. For example, preparing the tool at 306 may include applying a cover to the tool (e.g., cover 42, which may be a removable cover) at 312, applying heat and/or pressure to the tool and/or the composite material at 314, applying a release coating to the tool at 315 (e.g., applying a liquid mold-release, such as a silicone-based release coating to the first composite material-receiving surface, the second composite material-receiving surface, the first flange surface, the second flange surface, the third flange surface, and/or the fourth flange surface), applying a vacuum bag over the tool at 316 (e.g., at least a portion of the tool may be enveloped by the vacuum bag, such as vacuum bag 44), drawing a vacuum at 318, thereby drawing the vacuum bag against the tool and the composite material and compacting the composite material against the tool (e.g., pressing the composite material against the first composite material-receiving surface, the second composite material-receiving surface, the first flange surface, the second flange surface, the third flange surface, and/or the fourth flange surface of the tool). In some methods 300, applying the vacuum bag at 316 may include coupling the vacuum bag to a base of the tool (e.g., base 50). The vacuum bag may be applied at 316 such that it is arranged through a space (e.g., tool space 86) defined between the first composite material-receiving surface and the second composite material-receiving surface, such that when a vacuum is drawn at 318, the vacuum bag conforms to the first composite material-receiving surface and the second composite material-receiving surface, thereby compacting the composite material against the first composite material-receiving surface and the second composite material-receiving surface.

Additionally or alternatively, preparing the tool at 306 may include applying breather material and/or release material (also referred to herein as a "peel ply" material) between the composite material and the vacuum bag at 322 (e.g., sandwiching the composite material between the peel ply material and the first composite material-receiving surface and/or sandwiching the composite material between the peel ply material and the second composite material-receiving surface, with the peel ply material being sandwiched between the composite material and the breather material). The breather material may be configured to soak up excess resin or other material from the composite material as the composite material is compacted and/or cured, and the release material may be configured to prevent the breather material from adhering to the composite material, thereby facilitating removal of the breather material from the composite part after curing. Preparing the tool at 306 may additionally or alternatively include applying one or more cauls at 324, thereby sandwiching the composite material between the tool and the caul. Applying one or more cauls (e.g., one or more cauls 39) at 324 may include applying a first caul at a first mating interface between the first composite material-receiving surface and the first flange surface, applying a second caul at a second mating interface between the first composite material-receiving surface and the second flange surface, applying a third caul at a third mating interface between the second composite material-receiving surface and the third flange surface, and/or applying a fourth caul at a fourth mating interface between the second composite material-receiving surface and the fourth flange surface. The cauls may be applied at 324 such that one or more cauls are formed integrally with each other. In some methods 300, applying one or more cauls at 324 may be performed after a plurality of repetitions of applying a ply of composite material at 304 and compacting the material at 307. For example, applying one or more cauls at 324 may be performed after the final ply of composite material has been placed on the tool. In some methods, cauls may comprise a reinforced flexible material, such as graphite-reinforced rubber.

Applying the removable cover at 312 may be performed before the curing the composite material at 308 and before the applying the vacuum bag at 316 and the drawing a vacuum at 318. In this manner, the removable cover may provide a surface for the vacuum bag to engage with, thereby substantially preventing the vacuum bag from being drawn into spaces between any adjacent spacer plates in the tool.

Compacting the composite material at 307 may include performing a vacuum compaction on one or more layers (plies) of composite material that has been placed onto the tool. For example, in some methods, a compaction may be performed at 307 for every two or three layers of composite material placed on the tool at 304. For example, one or more layers of composite material may be applied at 304, and a first compaction may be performed at 307 in order to debulk the composite material (e.g., draw out any trapped air) and cause it to tightly conform to the tool. Then, another two or more layers of composite material may be applied at 304, and a second compaction may be performed at 307. This alternating process may be repeated until the desired number of layers of composite material has been applied at 304. Once all of the layers of composite material have been applied to the tool, the composite material may be cured at 308 in order to form the resulting composite part.

Curing the composite material at 308 may include waiting a sufficient amount of time while the composite material is compacted against the tool, such that the composite material is at least partially cured (e.g., hardened) into the shape defined by the tool. In some methods 300, curing the composite material at 308 may include placing the tool, the composite material, and the vacuum bag into an autoclave at a sufficient temperature and pressure in order to cure the composite material into a resulting composite part. Once at least partially cured, the resulting composite part may be removed from the tool at 326. In some methods 300, a removable cover may be removed from the tool at 328, and/or the tool may be opened to an open configuration, such as by moving the second tool piece with respect to the first tool piece at 330 before the part is removed from the tool at 326. Moving the second tool piece at 330 may include separating one or more first fastening plates (e.g., first fastening plate 164) from one or more second fastening plates (e.g., first fastening plate 166) at 332, such that the tool is no longer retained in the closed position. Additionally or alternatively, moving the second tool piece at 330 may include pivoting the second tool piece about a tool hinge (e.g., hinge 88), thereby moving the second tool piece with respect to the first tool piece and separating the second composite material-receiving surface from the first composite material-receiving surface.

Methods 300 also may include performing one or more finishing operations at 334 on the resulting composite part, after at least partially curing the part at 308 and/or removing the composite part from the tool at 326. For example, performing one or more finishing operations at 334 may include sanding, buffing, trimming, painting, coating, sealing, inspecting, heating, and/or any other desired finishing operation.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

Illustrative, non-exclusive examples of inventive subject matter according to the present disclosure are described in the following enumerated paragraphs:

A1. A tool for manufacturing a composite part, the tool comprising:

a first tool piece comprising a first flange surface, a second flange surface opposite the first flange surface, and a first composite material-receiving surface extending from the first flange surface to the second flange surface; and a second tool piece comprising a third flange surface, a fourth flange surface opposite the third flange surface, and a second composite material-receiving surface extending from the third flange surface to the fourth flange surface, wherein the tool is configured to be selectively moved between a closed position and an open position, wherein, in the closed position, the second tool piece is positioned adjacent the first tool piece, the third flange surface and the first flange surface are parallel to one another, the second flange surface and the fourth flange surface are parallel to one another, and the first composite material-receiving surface is arranged facing the second composite material-receiving surface such that the first composite material-receiving surface and the second composite material-receiving surface define a tool space in which the composite part may be formed, the tool space having a longitudinal tool axis extending through a center of the tool space, from the first flange surface towards the second flange surface, and wherein, in the open position, at least a portion of the second tool piece is spaced apart from the first tool piece.

A1.1. The tool of paragraph A1, wherein the second tool piece is configured to be selectively moveable between a first position and a second position, the first position corresponding to the tool being in the closed position and the second position corresponding to the tool being in the open position.

A1.2. The tool of paragraph A1.1, further comprising a tool hinge operatively coupled to the first tool piece and the second tool piece, the tool hinge being configured to enable selective pivoting of the second tool piece towards or away from the first tool piece, about the tool hinge.

A1.3. The tool of any of paragraphs A1 to A1.2, wherein the second tool piece is selectively removable from the first tool piece.

A2. The tool of any of paragraphs A1-A1.3, further comprising a base configured to support the first tool piece and the second tool piece.

A3. The tool of paragraph A2, wherein the base comprises a first planar surface arranged adjacent the first tool piece.

A4. The tool of any of paragraphs A2-A3, wherein the first tool piece is positioned with respect to the base such that the first flange surface and the second flange surface are perpendicular to the base.

A5. The tool of any of paragraphs A2-A3, wherein the first tool piece is positioned with respect to the base such that the first flange surface and the second flange surface form a non-perpendicular angle with the base.

A6. The tool of any of paragraphs A2-A5, wherein the first tool piece is selectively removable from the base.

A7. The tool of any of paragraphs A2-A6, wherein the first tool piece is coupled, optionally permanently, to the base.

A7.1. The tool of any of paragraphs A1-A7, wherein the first tool piece comprises a first upper portion and a first lower portion.

A7.2. The tool of paragraph A7.1, wherein the first upper portion is positioned adjacent the second tool piece when the tool is in the closed position, and the first lower portion is positioned adjacent the base.

A7.3. The tool of any of paragraphs A1-A7.2, wherein the second tool piece comprises a second upper portion and a second lower portion.

A7.4. The tool of paragraph A7.3, wherein, in the closed position, the second lower portion is positioned adjacent the first upper portion.

A8. The tool of any of paragraphs A1-A7.4, wherein the first flange surface is planar.

A9. The tool of any of paragraphs A1-A8, wherein the second flange surface is planar.

A10. The tool of any of paragraphs A1-A9, wherein the third flange surface is planar.

A11. The tool of any of paragraphs A1-A10, wherein the fourth flange surface is planar.

A12. The tool of any of paragraphs A1-A11, wherein the second tool piece is selectively removable from the first tool piece, such that in the open position, the entire second tool piece is spaced apart from the first tool piece.

A13. The tool of any of paragraphs A1-A12, wherein, in the open position, the second composite material-receiving surface is spaced apart from the first composite material-receiving surface.

A14. The tool of any of paragraphs A1-A13, wherein, in the open position, the third flange surface is spaced apart from the first flange surface.

A15. The tool of any of paragraphs A1-A14, wherein, in the open position, the fourth flange surface is spaced apart from the second flange surface.

A16. The tool of any of paragraphs A1-A15, wherein, in the closed position, a first perimeter defined by the first composite material-receiving surface and the second composite material-receiving surface is circular, the first perimeter being adjacent the first flange surface and the third flange surface.

A17. The tool of any of paragraphs A1-A16, wherein, in the closed position, a second perimeter defined by the first composite material-receiving surface and the second composite material-receiving surface is circular, the second perimeter being adjacent the second flange surface and the fourth flange surface.

A18. The tool of any of paragraphs A1-A17, wherein the first flange surface and the second flange surface are parallel to one another.

A19. The tool of any of paragraphs A1-A18, wherein the first flange surface and the second flange surface are arranged at a non-parallel angle to one another.

A20. The tool of any of paragraphs A1-A19, wherein the third flange surface and the fourth flange surface are parallel to one another.

A21. The tool of any of paragraphs A1-A20, wherein the third flange surface and the fourth flange surface are arranged at a/the non-parallel angle to one another.

A22. The tool of any of paragraphs A1-A21, wherein the space defined by the first composite material-receiving surface and the second composite material-receiving is a substantially tubular negative space.

A23. The tool of any of paragraphs A1-A22, wherein, in the closed position, the first composite material-receiving surface and the second composite material-receiving surface are configured to receive a composite material that is configured to form the composite part.

A24. The tool of paragraph A23, wherein, in the closed position, the first tool piece and the second tool piece are configured such that the composite material may extend through the space, from the first flange surface to the second flange surface.

A25. The tool of paragraph A23 or A24, wherein, in the closed position, the first tool piece and the second tool piece are configured such that the composite material may extend through the space, from the third flange surface to the fourth flange surface.

A26. The tool of any of paragraphs A1-A25, wherein the first composite material-receiving surface extends from a first edge to a second edge.

A26.1. The tool of paragraph A26, wherein the first flange surface is positioned a first distance from the second flange surface adjacent the first edge of the first composite material-receiving surface, the first distance being equal to a first length of the first edge of the first composite material-receiving surface, wherein the first flange surface is positioned a second distance from the second flange surface adjacent the second edge of the first composite material-receiving surface, the second distance being equal to a second length of the second edge of the first composite material-receiving surface, and wherein the second distance is greater than the first distance.

A27. The tool of any of paragraphs A1-A26.1, wherein the second composite material-receiving surface extends from a third edge to a fourth edge.

A27.1. The tool of paragraph A27, wherein the third flange surface is positioned a third distance from the fourth flange surface adjacent the third edge of the second composite material-receiving surface, the third distance being equal to a third length of the third edge of the second composite material-receiving surface, wherein the third flange surface is positioned a fourth distance from the fourth flange surface adjacent the fourth edge of the second composite material-receiving surface, the fourth distance being equal to a fourth length of the fourth edge of the second composite material-receiving surface, and wherein the fourth distance is greater than the third distance.

A28. The tool of paragraphs A26 and A27, wherein, in the closed position, the first edge of the first composite material-receiving surface is positioned adjacent the third edge of the second composite material-receiving surface, and the second edge of the first composite material-receiving surface is positioned adjacent the fourth edge of the second composite material-receiving surface.

A29. The tool of paragraph A28, wherein the first distance is substantially equal to the third distance and wherein the third distance is substantially equal to the fourth distance.

A30. The tool of any of paragraphs A1-A29, wherein the first tool piece comprises a first flange plate and a second flange plate, the first flange plate defining the first flange surface and a first inner surface, the second flange plate defining the second flange surface and a second inner surface, wherein the first flange plate and the second flange plate are arranged such that the first inner surface and the second inner surface face one another.

A31. The tool of paragraph A30, further comprising a plurality of first spacer plates positioned between the first flange plate and the second flange plate of the first tool piece, each of the first spacer plates having a first upper spacer surface and a first lower spacer surface separated by a first thickness that defines a first coupling surface extending around a first spacer perimeter, a first portion of the first coupling surface being coupled to the first inner surface and a second portion of the first coupling surface being coupled to the second inner surface.

A32. The tool of paragraph A31, wherein the first portion of the first coupling surface is welded to the first inner surface of the first flange plate and the second portion of the first coupling surface is welded to the second inner surface of the second flange plate.

A33. The tool of any of paragraphs A31-A32, wherein each of the plurality of first spacer plates is arranged such that each respective first upper surface and first lower surface is perpendicular to the first inner surface of the first flange plate and the second inner surface of the second flange plate.

A34. The tool of any of paragraphs A31-A33, wherein the plurality of first spacer plates are arranged such that each respective first upper surface and first lower surface extends radially outward from the space defined by the first composite material-receiving surface and the second composite material-receiving surface.

A35. The tool of any of paragraphs A31-A34, wherein the plurality of first spacer plates comprises at least two first spacer plates, at least three first spacer plates, at least four first spacer plates, at least five first spacer plates, at least six first spacer plates, at least seven first spacer plates, at least eight first spacer plates, and/or more than eight first spacer plates.

A36. The tool of any of paragraphs A31-A35, wherein each respective first spacer plate is spaced apart from each of the other first spacer plates.

A36.1. The tool of paragraphs A3 and A36, wherein an open space is formed between each respective pair of adjacent first spacer plates, each open space being defined by at least two of one first upper surface of one respective first spacer plate, one first lower surface of the adjacent first spacer plate, and the first planar surface of the base.

A37. The tool of any of paragraphs A1-A36.1, wherein the second tool piece comprises a third flange plate and a fourth flange plate, the third flange plate being defined by the third flange surface and a third inner surface, the fourth flange plate being defined by the fourth flange surface and a fourth inner surface, wherein the third flange plate and the fourth flange plate are arranged such that the third inner surface and the fourth inner surface face one another.

A38. The tool of paragraph A37, further comprising a plurality of second spacer plates positioned between the third flange plate and the fourth flange plate of the second tool piece, each of the second spacer plates having a second upper spacer surface and a second lower spacer surface separated by a second thickness that defines a second coupling surface extending around a second spacer perimeter, a first portion of the second coupling surface being coupled to the third inner surface and a second portion of the second coupling surface being coupled to the fourth inner surface.

A39. The tool of paragraph A38, wherein the first portion of the second coupling surface is welded to the third inner surface of the third flange plate and the second portion of the second coupling surface is welded to the fourth inner surface of the fourth flange plate.

A40. The tool of any of paragraphs A38-A39, wherein each of the plurality of second spacer plates is arranged such that each respective second upper surface and second lower surface is perpendicular to the third inner surface of the third flange plate and the fourth inner surface of the fourth flange plate.

A41. The tool of any of paragraphs A38-A40, wherein the plurality of second spacer plates are arranged such that each respective second upper surface and second lower surface extends radially outward from the space defined by the first composite material-receiving surface and the second composite material-receiving surface.

A42. The tool of any of paragraphs A38-A41, wherein the plurality of second spacer plates comprises at least two second spacer plates, at least three second spacer plates, at least four second spacer plates, at least five second spacer plates, at least six second spacer plates, at least seven second spacer plates, at least eight second spacer plates, and/or more than eight second spacer plates.

A43. The tool of any of paragraphs A38-A42, wherein each respective second spacer plate is spaced apart from each of the other second spacer plates.

A43.1. The tool of paragraph A38, wherein an open space is formed between each respective pair of adjacent second spacer plates, each open space being defined by one second upper surface of one respective second spacer plate, one second lower surface of the adjacent second spacer plate.

A44. The tool of any of paragraphs A1-A43.1, further comprising a first fastening plate coupled to the first tool piece, and a second fastening plate coupling to the second tool piece, the first fastening plate and the second fastening plate being configured to be selectively coupled together, thereby at least partially securing the tool in the closed position.

A45. The tool of paragraph A44, wherein the tool is configured such that, in the open position, the first fastening plate and the second fastening plate are spaced apart from one another.

A46. The tool of any of paragraphs A44-A45, further comprising at least a first fastener configured to selectively couple the first fastening plate to the second fastening plate.

A47. The tool of any of paragraphs A44-A46, wherein the first fastening plate and the second fastening plate are hinged together.

A48. The tool of paragraph A7.1 and any of paragraphs A44-A47, wherein the first fastening plate is positioned adjacent the first upper portion of the first tool piece.

A49. The tool of paragraph A7.3 and any of paragraphs A44-A48, wherein the second fastening plate is positioned adjacent the second lower portion of the second tool piece.

A50. The tool of paragraph A26 and any of paragraphs A44-A49, wherein the first fastening plate is positioned adjacent the second edge of the first composite material-receiving surface.

A51. The tool of paragraph A27 and any of paragraphs A44-A50, wherein the second fastening plate is positioned adjacent the fourth edge of the second composite material-receiving surface.

A52. The tool of any of paragraphs A44-A51, wherein the first fastening plate is positioned between the first flange surface and the second flange surface.

A53. The tool of paragraph A30 and any of paragraphs A44-A52, wherein the first fastening plate is positioned between the first flange plate and the second flange plate.

A54. The tool of paragraph A30 and any of paragraphs A44-A53, wherein the first fastening plate is coupled to the first inner surface and the second inner surface.

A55. The tool of any of paragraphs A44-A54, wherein the second fastening plate is positioned between the third flange surface and the fourth flange surface.

A56. The tool of paragraph A37 and any of paragraphs A44-A55, wherein the second fastening plate is positioned between the third flange plate and the fourth flange plate.

A57. The tool of paragraph A37 and any of paragraphs A44-A56, wherein the second fastening plate is coupled to the third inner surface and the fourth inner surface.

A57.1. The tool of any of paragraphs A44-A57, wherein the first fastening plate is coupled to first flange surface and the second flange surface.

A57.2. The tool of any of paragraphs A44-A57.1, wherein the second fastening plate is coupled to the third flange surface and the fourth flange surface.

A58. The tool of any of paragraphs A1-A57.2, further comprising a third fastening plate coupled to the first tool piece, and a fourth fastening plate coupling to the second tool piece, the third fastening plate and the fourth fastening plate being configured to be selectively coupled together, thereby at least partially securing the tool in the closed position.

A59. The tool of paragraph A58, wherein the tool is configured such that, in the open position, the third fastening plate and the fourth fastening plate are spaced apart from one another.

A60. The tool of any of paragraphs A58-A59, further comprising at least a second fastener configured to selectively couple the third fastening plate to the fourth fastening plate.

A61. The tool of any of paragraphs A58-A60, wherein the third fastening plate and the fourth fastening plate are hinged together.

A62. The tool of paragraph A7.1 and any of paragraphs A58-A61, wherein the third fastening plate is positioned adjacent the first upper portion of the first tool piece.

A63. The tool of paragraph A7.3 and any of paragraphs A58-A62, wherein the fourth fastening plate is positioned adjacent the second lower portion of the second tool piece.

A64. The tool of paragraph A26 and any of paragraphs A58-A63, wherein the third fastening plate is positioned adjacent the first edge of the first composite material-receiving surface.

A65. The tool of paragraph A27 and any of paragraphs A58-A64, wherein the fourth fastening plate is positioned adjacent the third edge of the second composite material-receiving surface.

A66. The tool of any of paragraphs A58-A65, wherein the third fastening plate is positioned between the first flange surface and the second flange surface.

A67. The tool of paragraph A30 and any of paragraphs A58-A66, wherein the third fastening plate is positioned between the first flange plate and the second flange plate.

A68. The tool of paragraph A30 and any of paragraphs A58-A67, wherein the third fastening plate is coupled to the first inner surface and the second inner surface.

A69. The tool of any of paragraphs A58-A68, wherein the fourth fastening plate is positioned between the third flange surface and the fourth flange surface.

A70. The tool of paragraph A37 and any of paragraphs A58-A69, wherein the fourth fastening plate is positioned between the third flange plate and the fourth flange plate.

A71. The tool of paragraph A37 and any of paragraphs A58-A70, wherein the fourth fastening plate is coupled to the third inner surface and the fourth inner surface.

A72. The tool of any of paragraphs A58-A71, wherein the third fastening plate is coupled to first flange surface and the second flange surface.

A73. The tool of any of paragraphs A58-A72, wherein the fourth fastening plate is coupled to the third flange surface and the fourth flange surface.

A74. The tool of any of paragraphs A1-A73, further comprising a removable cover.

A75. The tool of paragraph A74, wherein the removable cover is configured to be placed on the tool when the tool is in the closed position.

A76. The tool of paragraph A30, A37, and any of paragraphs A74-A75, wherein the removable cover is configured to be placed on the tool such that it at least partially covers a first gap between the first flange plate and the second flange plate, and such that it at least partially covers a second gap between the third flange plate and the fourth flange plate.

A77. The tool of paragraph A31 and any of paragraphs A74-A76, wherein the removable cover is configured to engage the plurality of first spacer plates.

A78. The tool of paragraph A37 and any of paragraphs A74-A77, wherein the removable cover is configured to engage the plurality of second spacer plates.

A79. The tool of any of paragraphs A74-A78, wherein the removable cover comprises a generally U-shaped plate having a first elongated portion and a second elongated portion connected by an arch portion, the first elongated portion extending from the arch portion to a first cover end, and the second elongated portion extending from the arch portion to a second cover end.

A80. The tool of paragraph A7.3 and A79, wherein the arch portion of the removable cover is positioned adjacent the second upper portion of the second tool piece.

A81. The tool of paragraphs A7.1 and any of paragraphs A79-A80, wherein the first cover end and the second cover end of the removable cover are positioned adjacent the first lower portion of the first tool piece.

A82. The tool of paragraph A1.1 and any of paragraphs A74-A81, wherein at least a portion of the removable cover is selectively movable along with the second tool piece as the second tool piece is moveable from the first position to the second position.

A83. The tool of any of paragraphs A74-A81, wherein the removable cover comprises a cover hinge configured to enable a first portion of the removable cover to selectively pivot towards or away from a second portion of the removable cover, about the cover hinge.

A84. The tool of any of paragraphs A1-A83, wherein a majority of a volume defined by the first flange surface, the second flange surface, the third flange surface, and the fourth flange surface is hollow.

A85. The tool of any of paragraphs A1-A84, wherein the tool comprises metal.

A86. The tool of any of paragraphs A1-A85, wherein the tool comprises one or more of titanium, aluminum, invar, stainless steel, and steel.

A87. The tool of any of paragraphs A1-A86, wherein the first flange surface, the second flange surface, the third flange surface, the fourth flange surface, the first composite material-receiving surface, and the second composite material-receiving surface comprise metal.

A88. The tool of any of paragraphs A1-A87, further comprising a caul.

A89. The tool of any of paragraphs A1-A88, further comprising a groove formed in the first composite material-receiving surface and in the second composite material-receiving surface.

A90. The tool of paragraph A89, wherein the groove comprises a circumferential groove formed along the first composite material-receiving surface and the second composite material-receiving surface.

A91. The tool of any of paragraphs A89-A90, wherein the groove comprises a longitudinal groove oriented along the longitudinal tool axis.

A92. The tool of any of paragraphs A89-A91, wherein the groove comprises a plurality of grooves.

A93. The tool of any of paragraphs A89-A92, wherein the groove is configured to receive excess material from a/the composite material applied to the tool in order to form the composite part.

A94. The tool of any of paragraphs A1-A93, wherein the composite part the tool is configured to manufacture comprises a part inner surface and an part outer surface, the composite part defining a hollow interior space inside the part inner surface, and wherein the tool is configured such that as the composite part is being formed on the tool, the part outer surface engages the first composite material-receiving surface and the second composite material-receiving surface.

A95. The tool of any of paragraphs A1-A94, wherein the composite part the tool is configured to manufacture conforms to the first composite material-receiving surface and the second composite material-receiving surface of the tool.

A96. The tool of any of paragraphs A1-A95, wherein the composite part the tool is configured to manufacture conforms to the first flange surface, the second flange surface, the third flange surface, and the fourth flange surface.

A97. The tool of any of paragraphs A1-A96, wherein the tool is configured to define and form a three-dimensional shape of the composite part the tool is configured to manufacture.

B1. A system for manufacturing a composite part from a composite material, the system comprising:
the tool of any of paragraphs A1-A97; and
a vacuum device configured to draw a vacuum on the tool, thereby pressing the composite material against the first composite material-receiving surface and the second composite material-receiving surface of the tool.

B1.1. The system of paragraph B1, further comprising the composite material.

B2. The system of paragraph B1.1, wherein the composite material is a pre-impregnated composite material.

B3. The system of any of paragraphs B1.1-B2, wherein the composite material comprises one or more of carbon fiber, aramid, fiberglass, and a fiber-reinforced polymer material.

B4. The system of any of paragraphs B1-B3, further comprising a vacuum bag configured to be placed on the tool, thereby enveloping at least a portion of the tool, the vacuum bag being coupled to the vacuum device and configured to press onto the tool when a vacuum is drawn with the vacuum device.

B5. The system of paragraph B4, wherein the vacuum bag comprises a polymer film.

B6. The system of any of paragraphs B4-B5, wherein the vacuum bag comprises an elastomer.

B7. The system of any of paragraphs B4-B6, wherein the vacuum bag comprises silicone.

B8. The system of any of paragraphs B4-B7, wherein the vacuum bag comprises an elastomeric vacuum tool.

B9. The system of any of paragraphs B4-B8 wherein the vacuum bag is custom-formed to be configured for use with the tool.

B10. The system of any of paragraphs B1-B9, further comprising a heat source configured to apply heat and/or pressure to the tool and the composite material placed thereon.

B10.1. The system of paragraph B10, wherein the heat source comprises an autoclave in which the tool and the composite material may be placed for curing.

B11. The system of any of paragraphs B1-B10.1, wherein the system is configured to cure the composite material, thereby forming the composite part.

B12. The system of any of paragraphs B1-B11, further comprising the composite material, wherein the composite material comprises a fabric composite material.

B13. The system of any of paragraphs B1-B12, further comprising the composite material, wherein the composite material comprises a woven composite material.

B14. The system of any of paragraphs B1-B13, further comprising the composite material, wherein the composite material comprises a plurality of layers of composite material, the plurality of layers being arranged in a partially overlapping configuration on the first composite material-receiving surface and the second composite material-receiving surface of the tool.

B15. The system of any of paragraphs B1-B14, further comprising the composite material, wherein the composite material comprises a plurality of pieces, each of the plurality of pieces being shaped such that each respective piece is configured to engage with one or more other respective pieces, the first composite material-receiving surface, and/or the second composite material-receiving surface of the tool.

B16. The system of any of paragraphs B1-B15, further comprising the composite material, wherein the composite part the system is configured to manufacture comprises a part inner surface and a part outer surface, the part inner surface defining a hollow interior space inside the composite part, wherein the composite material comprises a material inner surface and an opposite, material outer surface, wherein the system is configured such that the composite material is placed such that the material outer surface is placed on the first composite material-receiving surface and the second composite material-receiving surface of the tool, wherein the material outer surface is configured to become the part outer surface once the composite part is manufactured, and wherein the material inner surface is configured to become the part inner surface once the composite part is manufactured.

B17. The system of paragraph B4 and any of paragraphs B1-B16, wherein the system is configured to manufacture the composite part such that a/the part outer surface is in direct contact with the first composite material-receiving surface and the second composite material-receiving surface of the tool, and wherein the system is configured such that the vacuum bag is positioned interior to a/the part inner surface, wherein the composite part is configured such that part outer surface is oriented radially outward from a longitudinal part axis of the composite part, the longitudinal part axis corresponding to the longitudinal tool axis, the part outer surface defining an exterior portion of the composite part, and the part inner surface is oriented radially inward, facing the longitudinal part axis of the composite part, the part inner surface defining a hollow interior space of the composite part.

B18. The system of any of paragraphs B1-B17, wherein the composite part the tool is configured to manufacture conforms to the first composite material-receiving surface and the second composite material-receiving surface.

B19. The system of any of paragraphs B1-B18, wherein the composite part the tool is configured to manufacture conforms to the first flange surface, the second flange surface, the third flange surface, and the fourth flange surface.

C1. A composite part manufactured using the tool of any of paragraphs A1-A97 and/or the system of any of paragraphs B1-B19.

C2. The composite part of paragraph C1, wherein the composite part comprises a duct.

C3. The composite part of any of paragraphs C1-C2, wherein the composite part comprises a pressure pan for an aircraft.

C4. The composite part of any of paragraphs C1-C3, wherein the composite part comprises a part of an aircraft.

C5. The composite part of any of paragraphs C1-C4, wherein the composite part is configured to be coupled to a fuel system of an aircraft.

C6. The composite part of any of paragraphs C1-05, wherein the composite part comprises a tubular portion extending from a first end to a second end.

C6.1. The composite part of paragraph C6, wherein the tubular portion comprises an/the part outer surface facing radially outward from a/the longitudinal part axis extending through a/the center of the composite part from the first end to the second end, the tubular portion further comprising an/the part inner surface defining a/the hollow interior space of the composite part and facing radially inward towards the longitudinal part axis.

C6.2. The composite part of any of paragraphs C6-C6.1, wherein the part outer surface conforms to the first composite material-receiving surface and the second composite material-receiving surface of the tool.

C6.3. The composite part of any of paragraphs C6-C6.2, wherein the tubular portion of the composite part is configured to a fuel line of an aircraft to extend therethrough.

C7. The composite part of any of paragraphs C6-C6.3, wherein the composite part comprises a first flange positioned adjacent the first end of the tubular portion, the first flange extending radially outward from the tubular portion.

C7.1. The composite part of paragraph C7, wherein the first flange conforms to the first flange surface and the third flange surface of the tool.

C8. The composite part of paragraph C7 or C7.1, wherein the first flange forms a first angle with the tubular portion, and wherein the first angle is approximately 90 degrees, such that the first flange is approximately perpendicular to the tubular portion of the composite part.

C9. The composite part of paragraph C7, wherein the first flange forms a first angle with the tubular portion and wherein the first angle is acute.

C10. The composite part of paragraph C7, wherein the first flange forms a first angle with the tubular portion and wherein the first angle is obtuse.

C11. The composite part of any of paragraphs C7-C10, wherein the first flange forms a/the first angle with the tubular portion, the first angle being substantially constant around a circumference of the tubular portion.

C12. The composite part of any of paragraphs C7-C10, wherein the first flange forms a/the first angle with the tubular portion, the first angle being variable around a circumference of the tubular portion.

C13. The composite part of any of paragraphs C7-C12, wherein the first flange extends radially outward from the tubular portion around the entire circumference of the tubular portion.

C14. The composite part of any of paragraphs C6-C13, wherein the composite part comprises a second flange positioned adjacent the second end of the tubular portion, the second flange extending radially outward from the tubular portion.

C14.1. The composite part of paragraph C14, wherein the second flange conforms to the second flange surface and the fourth flange surface of the tool.

C15. The composite part of paragraph C14 or C14.1, wherein the second flange forms a second angle with the tubular portion, and wherein the second angle is approximately 90 degrees, such that the second flange is approximately perpendicular to the tubular portion of the composite part.

C16. The composite part of paragraph C14, wherein the second flange forms a second angle with the tubular portion and wherein the second angle is acute.

C17. The composite part of paragraph C14, wherein the second flange forms a second angle with the tubular portion and wherein the second angle is obtuse.

C18. The composite part of any of paragraphs C14-C17, wherein the second flange forms a/the second angle with the tubular portion, the second angle being substantially constant around a circumference of the tubular portion.

C19. The composite part of any of paragraphs C14-C17, wherein the second flange forms a/the second angle with the tubular portion, the second angle being variable around a circumference of the tubular portion.

C20. The composite part of any of paragraphs C14-C19, wherein the second flange extends radially outward from the tubular portion around the entire circumference of the tubular portion.

C21. The composite part of any of paragraphs C6-C20, wherein the tubular portion is substantially cylindrical.

C22. The composite part of any of paragraphs C6-C21, wherein a first perimeter of the first end is circular.

C23. The composite part of any of paragraphs C6-C21, wherein a first perimeter of the first end is non-circular.

C24. The composite part of paragraph C23, wherein the first perimeter is elliptical.

C25. The composite part of any of paragraphs C6-C24, wherein a second perimeter of the second end is circular.

C26. The composite part of any of paragraphs C6-C24, wherein a second perimeter of the second end is non-circular.

C27. The composite part of paragraph C26, wherein the second perimeter is elliptical.

C28. The composite part of any of paragraphs C6-C27, wherein the tubular portion has a circular perpendicular cross-section.

C29. The composite part of any of paragraphs C6-C28, wherein a distance between the first end and the second end varies around the circumference of the tubular portion.

C30. The composite part of any of paragraphs C6-C28, wherein a distance between the first end and the second end is substantially constant around the circumference of the tubular portion.

D1. An aircraft including the composite part of any of paragraphs C1-C30.

E1. A method of forming a composite part, the composite part having a part inner surface and a part outer surface, the part outer surface facing radially outward from a central longitudinal part axis extending from a first part end to a second part end, through a center of the composite part, the part inner surface defining a hollow interior space of the composite part and facing radially inward towards the longitudinal part axis, the method comprising:

providing the tool of any of paragraphs A1-A97;

applying a composite material to the tool such that the composite material conforms to the tool; and curing the composite material, thereby forming the composite part, the tool being configured to define a three-dimensional shape of the composite part.

E1.1. The method of paragraph E1, wherein the applying the composite material to the tool comprises applying the composite material such that the composite material conforms to the first composite material-receiving surface of the tool.

E1.2. The method of any of paragraphs E1-E.1.1, wherein the applying the composite material to the tool comprises applying the composite material such that the composite material conforms to the second composite material-receiving surface of the tool.

E2. The method of paragraph E1-E1.2, wherein the providing the tool comprises providing the system of any of paragraphs B1-B19.

E3. The method of any of paragraphs E1-E2, further comprising moving the tool to the open position.

E3.1. The method of paragraph E3, wherein the moving the tool to the open position comprises removing the second tool piece from the first tool piece.

E3.2. The method of any of paragraphs E3-E3.1, wherein the moving the tool to the open position comprises separating a/the first fastening plate from a/the second fastening plate, the first fastening plate and the second fastening plate being configured to at least partially retain the tool in the closed position.

E3.3. The method of any of paragraphs E3-E3.2, wherein the moving the tool to the open position comprises separating a/the third fastening plate from a/the fourth fastening plate, the third fastening plate and the fourth fastening plate being configured to at least partially retain the tool in the closed position.

E3.4. The method of any of paragraphs E3-E3.3, wherein the moving the tool to the open position comprises moving the second tool piece with respect to the first tool piece.

E3.5. The method of any of paragraphs E3-E3.4, wherein the moving the tool to the open position comprises pivoting the second tool piece about a/the tool hinge, thereby moving the second tool piece with respect to the first tool piece and separating the second composite material-receiving surface from the first composite material-receiving surface.

E4. The method of any of paragraphs E3-E3.5, wherein the moving the tool to the open position is performed after the curing the composite material.

E5. The method of any of paragraphs E1-E4, further comprising removing the composite part from the tool after the curing.

E6. The method of paragraph E5 and any of paragraphs E3-E4, wherein the removing the composite part from the tool is performed after the moving the tool to the open position.

E7. The method of any of paragraphs E1-E6, further comprising applying heat and/or pressure to the composite material and the tool.

E8. The method of any of paragraphs E1-E7, wherein the curing the composite material comprises applying heat and/or pressure to the composite material and the tool.

E8.1. The method of any of paragraphs E1-E8, wherein the curing the composite material comprises placing the composite material and the tool inside an autoclave.

E9. The method of any of paragraphs E1-E8, further comprising drawing a vacuum, thereby compacting the composite material against the first composite material-receiving surface and the second composite material-receiving surface.

E10. The method of any of paragraphs E1-E9, wherein the curing the composite material comprises drawing a vacuum such that the composite material is compacted against the first composite material-receiving surface and the second composite material-receiving surface.

E11. The method of any of paragraphs E1-E10, wherein the applying the composite material comprises applying a pre-impregnated composite material.

E12. The method of any of paragraphs E1-E11, wherein the applying the composite material comprises shaping and positioning a plurality of pieces of composite material.

E12.1. The method of paragraph E12, wherein the plurality of pieces of composite material comprises four pieces of composite material.

E12.2. The method of any of paragraphs E1-E12.1, wherein the applying the composite material comprises applying a plurality of layers of composite material.

E12.3. The method of paragraph E12.2, wherein each of the plurality of layers of composite material comprises a/the plurality of pieces of composite material.

E13. The method of any of paragraphs E1-E12.3, wherein the applying the composite material comprises applying a resin and a hardener to the composite material.

E14. The method of any of paragraphs E1-E13, further comprising placing a/the removable cover on the tool.

E15. The method of paragraph E14, wherein the placing the removable cover on the tool is performed before the curing the composite material.

E16. The method of any of paragraphs E14-E15, further comprising removing the removable cover from the tool.

E17. The method of paragraph E16, wherein the removing the removable cover from the tool is performed after the curing the composite material.

E18. The method of any of paragraphs E1-E17, further comprising applying a breather material and a peel ply material to the composite material, thereby sandwiching the composite material between the peel ply material and the first composite material-receiving surface and/or sandwiching the composite material between the peel ply material and the second composite material-receiving surface.

E19. The method of any of paragraphs E1-E18, further comprising enveloping at least a portion of the tool with a vacuum bag, the vacuum bag being configured to be drawn against the tool and the composite material, thereby compacting the composite material against the tool.

E20. The method of paragraph E19, wherein the enveloping at least a portion of the tool with the vacuum bag comprises coupling the vacuum bag to a/the base of the tool.

E21. The method of any of paragraphs E19-E20, wherein the enveloping at least a portion of the tool with the vacuum bag comprises enveloping at least a portion of the tool with an elastomeric vacuum bag.

E22. The method of any of paragraphs E19-E21, wherein the enveloping at least a portion of the tool with the elastomeric vacuum bag comprises enveloping at least a portion of the tool with a custom-formed elastomeric vacuum bag configured for use with the tool.

E23. The method of any of paragraphs E19-E22, wherein the enveloping at least a portion of the tool with the vacuum bag comprises arranging the vacuum bag through the space defined by the first composite material-receiving surface and the second composite material-receiving surface, such that when a vacuum is drawn, the vacuum bag conforms to the first composite material-receiving surface and the second composite material-receiving surface, thereby compacting the composite material against the first composite material-receiving surface and the second composite material-receiving surface.

E24. The method of any of paragraphs E1-E23, further comprising performing a finishing operation on the composite part.

E25. The method of paragraph E24 and any of paragraphs E5-E6, wherein the performing the finishing operation is performed after the removing the composite part from the tool.

E26. The method of any of paragraphs E1-E25, further comprising applying a caul, such that the composite material is sandwiched between the caul and the tool.

E27. The method of any of paragraphs E1-E26, wherein the applying the composite material to the tool comprises applying the composite material such that it conforms to the first flange surface, the second flange surface, the third flange surface, and the fourth flange surface of the tool.

E28. The method of any of paragraphs E1-E27, wherein the applying the composite material to the tool comprises applying the composite material to the tool such that a material outer surface of the composite material is in direct contact with the first composite material-receiving surface and the second composite material-receiving surface of the tool, the material outer surface being configured to form the part outer surface of the composite part.

E29. The method of any of paragraphs E1-E28, wherein the applying the composite material to the tool comprises splicing a/the plurality of pieces of composite material together.

E30. The method of paragraph E29, wherein the splicing the plurality of pieces of composite material together comprises splicing the plurality of pieces of composite material together, the splices extending longitudinally from the first part end to the second part end.

E31. The method of any of paragraphs E1-E30, wherein the applying the composite material to the tool comprises applying the composite material to the tool such that it conforms to the first composite material-receiving surface, the second composite material-receiving surface, the first flange surface, the second flange surface, the third flange surface, and the fourth flange surface.

E32. The method of any of paragraphs E1-E31, wherein the applying the composite material to the tool comprises applying a first piece of composite material to the tool such that it conforms to the first composite material-receiving surface, the first flange surface, and the second flange surface.

E33. The method of any of paragraphs E1-E32, wherein the applying the composite material to the tool comprises applying a second piece of composite material to the tool such that it conforms to the second composite material-receiving surface, the third flange surface, and the fourth flange surface.

E34. The method of any of paragraphs E1-E33, wherein the applying the composite material to the tool comprises applying the composite material such that it conforms to a convex radius defined by one or more of the first composite material-receiving surface, the second composite material-receiving surface, the first flange surface, the second flange surface, the third flange surface, and the fourth flange surface.

E35. The method of any of paragraphs E1-E34, further comprising applying a first caul at a first mating interface between the first composite material-receiving surface and the first flange surface.

E36. The method of any of paragraphs E1-E35, further comprising applying a second caul at a second mating interface between the first composite material-receiving surface and the second flange surface.

E37. The method of any of paragraphs E1-E36, further comprising applying a third caul at a third mating interface between the second composite material-receiving surface and the third flange surface.

E38. The method of any of paragraphs E1-E37, further comprising applying a fourth caul at a fourth mating interface between the second composite material-receiving surface and the fourth flange surface.

E39. The method of paragraphs E35 and E37, wherein the first caul and the third caul are formed integrally with each other.

E40. The method of paragraphs E36 and E38, wherein the second caul and the fourth caul are formed integrally with each other.

F1. A composite part made using the method of any of paragraphs E1-E40.

F2. The composite part according to paragraph F1, wherein the composite part comprises a tubular portion extending from a first part end to a second part end, the tubular portion comprising a part outer surface facing radially outward from a longitudinal part axis extending through a center of the composite part from the first part end to the second part end, the tubular portion further comprising an part inner surface facing radially inward toward the longitudinal part axis, the part inner surface defining a hollow interior space of the composite part.

F3. The composite part of any of paragraphs F1-F2, wherein the composite part comprises a duct.

F4. The composite part of any of paragraphs F1-F3, wherein the composite part comprises a first flange.

F5. The composite part of paragraphs F2 and F4, wherein the first flange is formed integrally with the tubular portion.

F6. The composite part of any of paragraphs F1-F5, wherein the composite part comprises a second flange.

F7. The composite part of paragraphs F2 and F6, wherein the second flange is formed integrally with the tubular portion.

F8. The composite part of any of paragraphs F1-F7, wherein the composite part comprises a pressure pan.

F9. The composite part of any of paragraphs F1-F8, wherein the composite part is configured to form a portion of a fuel system.

F10. The composite part of any of paragraphs F1-F9, wherein the composite part is an aircraft part.

F11. The composite part of any of paragraphs F1-F10, wherein the composite part is configured to connect a fuel line to a pressure dome of an aircraft.

G1. An aircraft including the part of any of paragraphs F1-F10.

H1. Use of the tool of any of paragraphs A1-A97 to form a composite part.

I1. Use of the tool of any of paragraphs A1-A97 in the manufacture of an aircraft.

J1. Use of the composite part of any of paragraphs C1-C30 in an aircraft.

K1. Use of the system of any of paragraphs B1-B19 to form a composite part.

L1. Use of the system of any of paragraphs B1-B19 in the manufacture of an aircraft.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and systems, and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A tool for manufacturing a composite part, the tool comprising:
a first tool piece comprising a first flange surface, a second flange surface opposite the first flange surface, and a first composite material-receiving surface extending from the first flange surface to the second flange surface, wherein the first flange surface is arranged at a non-parallel angle with respect to the second flange surface; and
a second tool piece comprising a third flange surface, a fourth flange surface opposite the third flange surface, and a second composite material-receiving surface extending from the third flange surface to the fourth flange surface, wherein the tool is configured to be selectively moved between a closed position and an open position, wherein, in the closed position, the second tool piece is positioned adjacent the first tool piece, the third flange surface and the first flange surface are parallel to one another, the second flange surface and the fourth flange surface are parallel to one another, and the first composite material-receiving surface is arranged facing the second composite material-receiving surface such that the first composite material-receiving surface and the second composite material-receiving surface define a tool space in which the composite part may be formed, the tool space having a longitudinal tool axis extending through a center of the tool space, from the first flange surface towards the second flange surface, wherein, in the closed position, the first composite material-receiving surface and the second composite material-receiving surface are configured to receive a composite material that is configured to form the composite part, and wherein, in the open position, at least a portion of the second tool piece is spaced apart from the first tool piece.

2. The tool according to claim 1, wherein the first tool piece comprises a first flange plate and a second flange plate, the first flange plate defining the first flange surface and a first inner surface, the second flange plate defining the second flange surface and a second inner surface, wherein the first flange plate and the second flange plate are arranged such that the first inner surface and the second inner surface face one another, wherein the second tool piece comprises a third flange plate and a fourth flange plate, the third flange plate being defined by the third flange surface and a third inner surface, the fourth flange plate being defined by the fourth flange surface and a fourth inner surface, and wherein the third flange plate and the fourth flange plate are arranged such that the third inner surface and the fourth inner surface face one another, the tool further comprising:

a plurality of first spacer plates positioned between the first flange plate and the second flange plate of the first tool piece, each of the first spacer plates having a first upper spacer surface and a first lower spacer surface separated by a first thickness that defines a first coupling surface extending around a first spacer perimeter, a first portion of the first coupling surface being coupled to the first inner surface and a second portion of the first coupling surface being coupled to the second inner surface; and a plurality of second spacer plates positioned between the third flange plate and the fourth flange plate of the second tool piece, each of the second spacer plates having a second upper spacer surface and a second lower spacer surface separated by a second thickness that defines a second coupling surface extending around a second spacer perimeter, a first portion of the second coupling surface being coupled to the third inner surface and a second portion of the second coupling surface being coupled to the fourth inner surface.

3. The tool according to claim 2, further comprising a removable cover configured to be placed on the tool such that it at least partially covers a first gap between the first flange plate and the second flange plate, and such that it at least partially covers a second gap between the third flange plate and the fourth flange plate, wherein the removable cover is configured to engage at least a portion of the plurality of first spacer plates and at least a portion of the plurality of second spacer plates.

4. A system configured for manufacturing a composite part from a composite material, the composite part comprising a tubular portion extending from a first end to a second end, and a first flange extending radially outward from the tubular portion, the first flange being positioned adjacent the first end of the tubular portion and being formed integrally with the tubular portion, the system comprising:

a tool, the tool comprising:
a first tool piece comprising a first flange surface, a second flange surface opposite the first flange surface, and a first composite material-receiving surface extending from the first flange surface to the second flange surface, wherein the first flange surface is arranged at a non-parallel angle with respect to the second flange surface; and
a second tool piece comprising a third flange surface, a fourth flange surface opposite the third flange surface, and a second composite material-receiving surface extending from the third flange surface to the fourth flange surface, wherein the tool is configured to be selectively moved between a closed position and an open position, wherein, in the closed position, the second tool piece is positioned adjacent the first tool piece, the third flange surface and the first flange surface are parallel to one another, the second flange surface and the fourth flange surface are parallel to one another, and the first composite material-receiving surface is arranged facing the second composite material-receiving surface such that the first composite material-receiving surface and the second composite material-receiving surface define a tool space in which the composite part may be formed, the tool space having a longitudinal tool axis extending through a center of the tool space, from the first flange surface towards the second flange surface, and wherein, in the open position, at least a portion of the second tool piece is spaced apart from the first tool piece; and a vacuum device configured to draw a vacuum against the first composite material-receiving surface, the second composite material-receiving surface, and the first flange surface of the tool, such that the composite material received thereon is pressed against the first composite material-receiving surface, the second composite material-receiving surface, and the first flange surface of the tool, wherein the system is configured to cure the composite material, thereby forming the composite part, the composite part being selectively removable from the tool after it is cured.

5. The system according to claim 4, further comprising the composite material, wherein the composite material is a pre-impregnated composite fabric material.

6. The system according to claim 4, further comprising a heat source configured to apply heat and pressure to the composite material and the tool.

7. The system according to claim 4, further comprising the composite part and the composite material, wherein the composite part comprises a part inner surface and a part outer surface, the part inner surface defining a hollow interior space inside the composite part, wherein the composite material comprises a material inner surface and an opposite, material outer surface, wherein the system is configured such that the composite material is placed such that the material outer surface is placed on the first composite material-receiving surface and the second composite material-receiving surface of the tool, wherein the material outer surface is configured to become the part outer surface once the. composite part is manufactured, and wherein the material inner surface is configured to become the part inner surface once the composite part is manufactured.

8. The system according to claim 4, further comprising a vacuum bag configured to be placed on the tool, thereby enveloping at least a portion of the tool, the vacuum bag being coupled to the vacuum device and configured to press onto the tool when the vacuum device draws a vacuum, wherein the vacuum bag comprises an elastomer.

9. The system according to claim 8, further comprising the composite part, wherein a part outer surface of the composite part is in direct contact with the first composite material-receiving surface and the second composite material-receiving surface of the tool, and wherein the system is configured such that the vacuum bag is positioned interior to a part inner surface of the composite part, wherein the composite part is configured such that the part outer surface is oriented radially outward from a longitudinal part axis of the composite part, the longitudinal part axis corresponding to the longitudinal tool axis, the part outer surface defining an exterior portion of the composite part, and wherein the part inner surface is oriented radially inward, facing the longitudinal part axis of the composite part, the part inner surface defining a hollow interior space of the composite part.

10. The system according to claim 4, further comprising the composite part, wherein the composite part conforms to the first composite material-receiving surface, the second composite material-receiving surface, the first flange surface, the second flange surface, the third flange surface, and the fourth flange surface.

* * * * *

UNITED STATES PATENT AND TRADEMARK OFFICE
CERTIFICATE OF CORRECTION

PATENT NO. : 9,895,848 B2
APPLICATION NO. : 14/693363
DATED : February 20, 2018
INVENTOR(S) : Michael P. Thompson and Otis Franklin Layton It is certified that error appears in the above-identified patent and that said Letters Patent is hereby corrected as shown below:

Claim 7, Column 38, Line 35, delete the "." after "the".

Signed and Sealed this
Seventeenth Day of April, 2018

Andrei Iancu
*Director of the United States Patent and Trademark Office*